US009322164B2

(12) United States Patent
Ray et al.

(10) Patent No.: US 9,322,164 B2
(45) Date of Patent: Apr. 26, 2016

(54) MULTILAYER AIR-CELLULAR INSULATION LAMINATE CONTAINING TWO-SIDE METALLIZED FILM

(75) Inventors: Steven W. Ray, Westfield, IN (US); Dale F. Tokarski, Anderson, IN (US); Lamont M. Millspaugh, Anderson, IN (US)

(73) Assignee: Sealed Air Corporation (US), Charlotte, NC (US)

( * ) Notice: Subject to any disclaimer, the term of this patent is extended or adjusted under 35 U.S.C. 154(b) by 433 days.

(21) Appl. No.: 13/199,121

(22) Filed: Aug. 19, 2011

(65) Prior Publication Data

US 2012/0042981 A1 Feb. 23, 2012

Related U.S. Application Data

(60) Provisional application No. 61/401,805, filed on Aug. 19, 2010.

(51) Int. Cl.
*F16L 9/14* (2006.01)
*B32B 3/26* (2006.01)
(Continued)

(52) U.S. Cl.
CPC ... *E04B 1/78* (2013.01); *B32B 3/28* (2013.01); *B32B 7/12* (2013.01); *B32B 27/08* (2013.01); *B32B 27/32* (2013.01); *B32B 27/36* (2013.01); *F24F 13/0263* (2013.01); *B32B 2250/40* (2013.01); *B32B 2255/10* (2013.01); *B32B 2255/205* (2013.01); *B32B 2255/28* (2013.01);
(Continued)

(58) Field of Classification Search
CPC  B32B 3/28; B32B 2250/40; B32B 2307/304; E04B 1/78

USPC ........................ 138/141, 148, 149; 428/178
See application file for complete search history.

(56) References Cited

U.S. PATENT DOCUMENTS 3,346,438 A   10/1967  Chavannes
3,577,305 A    5/1971  Hines et al.
(Continued)

FOREIGN PATENT DOCUMENTS

EP       1 624 121 A2    2/2006
WO    2010/019033 A1    2/2010

OTHER PUBLICATIONS

ASTM C 1371-04A, "Standard Test Method for Determination of Emmittance of Materials Near Room Temperature Using Portable Emissometers", pp. 780-787, ASTM International (2004).
(Continued)

*Primary Examiner* — J. Casimer Jacyna
(74) *Attorney, Agent, or Firm* — Rupert B. Hurley, Jr.

(57) ABSTRACT

A multilayer insulation has first and second outer polymeric layers having respective first and second outer metallized surfaces and respective first and second bonding layers inner side thereof. A third metallized coating is between the outer first and second polymeric layers. An air cellular assembly is between the first bonding layer and the second bonding layer. The air-cellular assembly has a plurality of air-filled cells between a first air cellular film and a second air-cellular film. In one embodiment, the third metallized coating is directly bonded to the first bonding layer, the second bonding layer, or a third bonding layer. Another embodiment has a total polymeric thickness of from 7 to 20 mils, a total thickness of from 1.5 to 4 centimeters, and an intrinsic normalized R-Value per inch of at least 2.9. A climate control duct can be surrounded by the multilayer insulation laminate.

17 Claims, 5 Drawing Sheets

(51) Int. Cl.
*B32B 7/02* (2006.01)
*E04B 1/78* (2006.01)
*B32B 3/28* (2006.01)
*F24F 13/02* (2006.01)
*B32B 7/12* (2006.01)
*B32B 27/08* (2006.01)
*B32B 27/32* (2006.01)
*B32B 27/36* (2006.01)
*E04B 1/76* (2006.01)

(52) U.S. Cl.
CPC ..... *B32B 2307/304* (2013.01); *B32B 2307/738* (2013.01); *E04B 2001/7691* (2013.01); *Y10T 428/2495* (2015.01); *Y10T 428/24967* (2015.01); *Y10T 428/249953* (2015.04)

(56) References Cited

U.S. PATENT DOCUMENTS

| | | | |
|---|---|---|---|
| 3,619,340 A | 11/1971 | Jones | |
| 3,640,831 A | 2/1972 | Gardner | |
| 3,741,253 A | 6/1973 | Brax et al. | |
| 4,313,993 A | 2/1982 | McGlory | |
| 4,401,706 A | 8/1983 | Sovilla | |
| 4,533,583 A | 8/1985 | May | |
| 4,631,221 A | 12/1986 | Disselbeck et al. | |
| 4,915,998 A | 4/1990 | Parenti, Jr. et al. | |
| 4,980,223 A | 12/1990 | Nakano et al. | |
| 5,034,998 A | 7/1991 | Kolsky | |
| 5,097,956 A | 3/1992 | Davis | |
| 5,274,846 A | 1/1994 | Kolsky | |
| 5,313,360 A | 5/1994 | Stockman | |
| 5,549,956 A | 8/1996 | Handwerker | |
| 5,599,606 A | 2/1997 | Disselbeck et al. | |
| 5,791,485 A | 8/1998 | Carbonneau | |
| 5,820,268 A | 10/1998 | Becker et al. | |
| 5,874,150 A | 2/1999 | Handwerker | |
| 6,007,467 A | 12/1999 | Becker et al. | |
| 6,055,825 A | 5/2000 | Choy | |
| 6,080,096 A | 6/2000 | Becker et al. | |
| 6,248,433 B1 * | 6/2001 | Aanestad | 428/304.4 |
| 6,322,873 B1 | 11/2001 | Orologio | |
| 6,514,596 B1 | 2/2003 | Orologio | |
| 6,536,189 B1 | 3/2003 | Murray | |
| 6,562,439 B2 | 5/2003 | Orologio | |
| 6,800,162 B2 | 10/2004 | Kannankeril et al. | |
| 7,001,656 B2 | 2/2006 | Maignan et al. | |
| 7,021,524 B1 | 4/2006 | Becker et al. | |
| 7,041,361 B2 | 5/2006 | Thomsen et al. | |
| 7,140,773 B2 | 11/2006 | Becker et al. | |
| 7,465,484 B2 | 12/2008 | Handwerker | |
| 8,186,387 B2 * | 5/2012 | Wadsworth | 138/149 |
| 2002/0098316 A1 | 7/2002 | Butler | |
| 2003/0047564 A1 | 3/2003 | Veiseh | |
| 2003/0087051 A1 | 5/2003 | Murray | |
| 2005/0031832 A1 | 2/2005 | Kannankeril et al. | |
| 2006/0000184 A1 | 1/2006 | Kannankeril et al. | |
| 2006/0029777 A1 | 2/2006 | Yanai | |
| 2006/0172095 A1 | 8/2006 | Elsaesser | |
| 2006/0260235 A1 | 11/2006 | Fedyna | |
| 2007/0071368 A1 | 3/2007 | Becker et al. | |
| 2007/0245664 A1 | 10/2007 | Orologio | |
| 2007/0248805 A1 | 10/2007 | Orologio | |
| 2008/0093426 A1 | 4/2008 | Kircher, Jr. | |
| 2008/0185408 A1 | 8/2008 | James | |
| 2008/0233383 A1 | 9/2008 | Handwerker | |
| 2008/0302049 A1 | 12/2008 | Stoneburner | |

OTHER PUBLICATIONS

ASTM C 335-05, "Standard Test Method for Steady-State Heat Transfer Properties of Pipe Insulation ae 1", 14 pp, ASTM International (Jun. 2005).

ASTM C 518-10, entitled "Standard Test Method for Steady-State Thermal Transmission Properties by Means of the Heat Flow Meter Apparatus", 18 pp, ASTM International (May 2010).

Schwartz, Alexander Schwartz, Alexander, "Heat Flow by Radiation in Buildings; Simplified Physics", Infra Insulation, Inc, pp. 148 (1957).

"Reflectix® Insulation; Solutions for the Contractor", Reflectix, Inc., pp. 1-19, (2005).

MPI Technologies: "Unique Radiant barrier Films for Insulation," 1 page (Jul. 2, 2009).

Vacumet Corp., "The Metallizing Process," www.vacumetinfo@vacumet.com, 3 pages (copyright 2008).

Thermal emittance, Wikipedia, 3 pp (printed Jan. 23, 2013).

Emissivity, Wikipedia, 1 pg, (printed Jan. 23, 2013).

Bishop, "Vacuum Web Coating," www.vacuumcoatingblog.co.uk, 3 pages, Mar. 24, 2008.

* cited by examiner

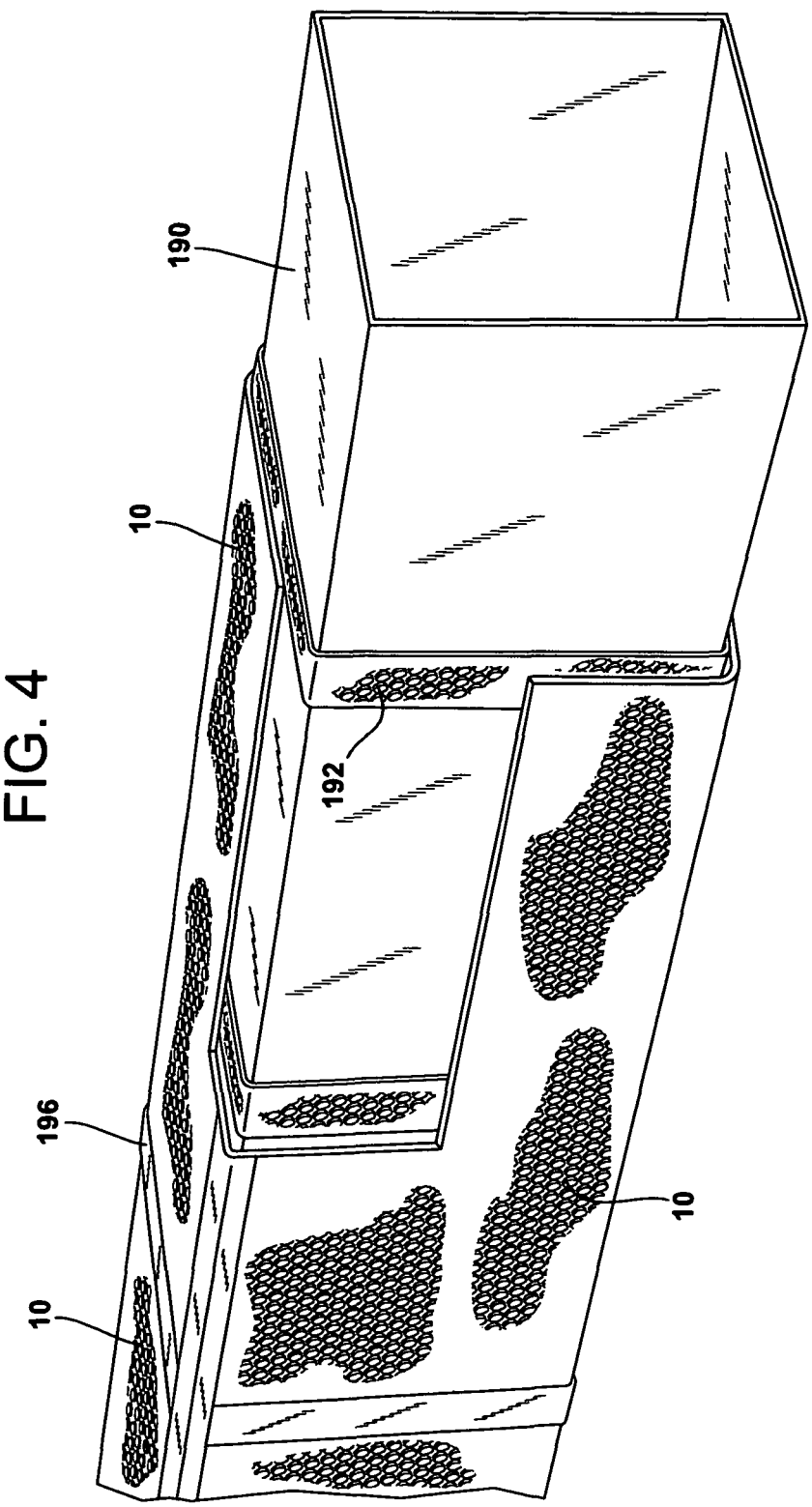

MULTILAYER AIR-CELLULAR INSULATION LAMINATE CONTAINING TWO-SIDE METALLIZED FILM

This application claims the benefit of provisional application No. 61/401,805 filed on Aug. 19, 2010.

FIELD AND BACKGROUND OF THE INVENTION

The present invention relates to the field of insulation designed to minimize heat transfer. Multilayer reflective insulation materials are known which comprise paper, or comprise plastic, including plastic air cellular articles, with one or more adhesive layers used to adhere various layers and/or components to one another. Some of these insulation materials comprise one or more metal foils or one or more metallized films.

Due to changes in burn testing, there has recently been a shift away from foil-containing air cellular type insulation to air cellular insulation containing at least one metallized film. The metallized film has an extremely thin layer of metallized aluminum deposited thereon, the metal typically being deposited on the film via a vacuum-assisted vapor deposition process.

SUMMARY OF THE INVENTION

It has been discovered that an insulation laminate having a relatively small amount of total thickness, in combination with multiple air cellular assemblies and multiple internal metallized layers, can provide a multilayer insulation laminate having a relatively high normalized intrinsic R-value. Moreover, such an insulation laminate, when placed around a heating/air-conditioning duct using a spacing of ¾ inch from the duct, can provide an insulation value of R-8.

It has also been discovered that adhesive layers disproportionately increase the thermal conductivity of multilayer insulation laminates utilizing an air cellular assembly in combination with one or more metallized layers. The minimization or absence of adhesive layers has been found to improve the insulation properties of multilayer insulation laminates through the decrease of the thermal conductivity of the laminate.

The thermal conductivity of a multilayer insulation laminate can be improved by providing the laminate with one or more internal regions bounded by at least one surface exhibiting an emittance value not exceeding 0.3, i.e., an emittance value of up to 0.3. Such an internal region can be provided by using two outer metallized surfaces in combination with an internal metallized surface and an air cellular assembly between one internal metallized surface and one of the outer metallized surfaces. Multiple internal regions exhibiting an emittance not exceeding 0.3 can be provided by using a first outer metallized surface, a first internal metallized surface, and a first air cellular assembly between the first outer metallized surface and the first internal metallized surface, and a second outer metallized surface, a second internal metallized surface, and a second air cellular assembly between the second outer metallized surface and the second internal metallized surface. Thermal conductivity can be further decreased by providing the multilayer insulation laminate with one or more internal regions with at least one of the regions being bounded on both sides by a surface exhibiting an emittance value not exceeding 0.3.

It has been discovered that a climate control duct can be insulated to a level of at least R-8 by surrounding the duct with a multilayer insulation laminate having outer metallized surfaces in combination with two air cellular assemblies separated by one or more internal metallized layers, the multilayer insulation laminate having one or more internal regions with at least one of the internal regions being bounded on one or both sides by a surface exhibiting an emittance value not exceeding 0.3. The internal metallized layer(s) provide one or more outwardly-facing metallized surfaces. Each of the air-cellular assemblies is between the internal metallized layer(s) and one of the outer metallized surfaces. The internal metallized layer(s) can be provided in a centrally positioned film having one metallized surface or two metallized surfaces, or two separate internal films each having at least one metallized surface.

A first aspect is directed to a multilayer insulation laminate comprising: (A) a multilayer first outer film comprising an outer first polymeric layer having a first metallized coating on an outer surface thereof and a first bonding layer on an inner side thereof, (B) a multilayer second outer film comprising an outer second polymeric layer having a second metallized coating on an outer surface thereof and a second bonding layer on an inner side thereof, (C) a multilayer internal film between the multilayer first outer film and the multilayer second outer film, the multilayer internal film having a third polymeric layer having a third metallized coating thereon and a third bonding layer adhered to the third metallized coating, the multilayer film further comprising a fourth metallized coating and a fourth bonding layer adhered to the fourth metallized coating, (D) a first thermoformed film between the first outer film and the multilayer internal film, the first thermoformed film having a first plurality of thermoformed regions separated by a first land area, the first land area being bonded to a member selected from the first bonding layer and the third bonding layer, with a first plurality of gas-filled cells between the first thermoformed film and the at least one member selected from the group consisting of the first bonding layer and the third bonding layer; and (E) a second thermoformed film between the second outer film and the multilayer internal film, the second thermoformed film having a second plurality of thermoformed regions separated by a second land area, the second land area being bonded to a member selected from the group of the second bonding layer and the fourth bonding layer, with a second plurality of gas-filled cells being between the second thermoformed film and the member selected from the group of the second bonding layer and the fourth bonding layer. The multilayer insulation laminate has a total polymeric thickness of from 7 to 20 mils, a total thickness of from 1.5 to 4 centimeters, and an intrinsic normalized R-Value per inch of at least 2.9. The first aspect can employ any one or more of the below-described features and embodiments of the second, third, and/or fourth aspects.

A second aspect is directed to a multilayer insulation laminate. The multilayer insulation laminate comprises (A) a multilayer first outer film comprising an outer first polymeric layer having a first metallized coating on an outer surface thereof and a first bonding layer on an inner side thereof, (B) a multilayer second outer film comprising an outer second polymeric layer having a second metallized coating on an outer surface thereof and a second bonding layer on an inner side thereof, (C) a third metallized coating between the outer first polymeric layer and the outer second polymeric layer. The third metallized coating being directly bonded to a member selected from the group consisting of: (i) the first bonding layer, (ii) the second bonding layer, and (iii) a third bonding layer between the first and second bonding layers. The multilayer insulation laminate further comprises an air cellular assembly between the first bonding layer and the second bonding layer, the air-cellular assembly comprising a plurality of air-filled cells between thermoformed regions of a thermoformed film having a land area which is bonded directly to a member selected from the group consisting of the first bonding layer, the second bonding layer, and the third bonding layer.

In an embodiment, the air cellular assembly can be present in a reflective space having a low side emittance of up to 0.3.

In an embodiment, the first metallized coating can exhibit an emittance of up to 0.1, and the second metallized coating can exhibit an emittance of up to 0.1.

In an embodiment, the multilayer insulation laminate can have a thermal conductivity of less than 0.34 Btu·in/ft²·hr·° F., as measured by ASTM C 518-04. Alternatively, the multilayer insulation laminate can have a thermal conductivity of less than 0.33 Btu·in/ft²·hr·° F., as measured by ASTM C 518-04. The multilayer insulation laminate can have a thermal conductivity of less than 0.32 Btu·in/ft²·hr·° F., as measured by ASTM C 518-04.

In an embodiment of the multilayer insulation laminate, the outer first polymeric layer can comprises polyester, the first metallized coating can comprise aluminum, the first bonding layer can comprise polyolefin, the outer second polymeric layer can comprise polyester, the second metallized coating can comprise aluminum, the second bonding layer can comprise polyolefin, the first air cellular film can comprise polyolefin, and the second air cellular film can comprise polyolefin.

In an embodiment of the multilayer insulation laminate, the outer first polymeric layer can have third metallized coating on the inner surface thereof, with the third metallized coating having the first bonding layer directly bonded thereto.

In an embodiment of the multilayer insulation laminate, the outer second polymeric layer can have a fourth metallized coating on the inner surface thereof, with the fourth metallized coating having the second bonding layer directly bonded thereto.

In an embodiment, the multilayer insulation laminate can further comprise an internal polymeric film having the third metallized coating on a surface thereof, with the third metallized coating having a third bonding layer directly bonded thereto, with the thermoformed film being between the first bonding layer and the internal polymeric film, with the thermoformed regions of the thermoformed film being directly bonded to the third bonding layer.

In an embodiment, the thermoformed film has a land area that is directly bonded to the first bonding layer.

In one embodiment, the thermoformed film is a first thermoformed film and the air cellular assembly is a first air cellular assembly and the internal polymeric film further comprises a fourth metallized coating on a surface thereof, with the fourth metallized coating having a fourth bonding layer directly bonded thereto, with the multilayer insulation laminate further comprising second air-cellular assembly comprising a second thermoformed film between the second bonding layer and the fourth bonding layer, the second air-cellular assembly comprising a second plurality of air-filled cells between the second thermoformed film and the second bonding layer, with the second thermoformed film having a land area directly bonded to the second bonding layer, with the thermoformed regions of the second thermoformed film being directly bonded to the fourth bonding layer.

In an embodiment, the first air cellular assembly is present in a first internal reflective space having a low side emittance of up to 0.3, and the second air cellular assembly is present in a second internal reflective space having a low side emittance of up to 0.3.

In an embodiment, the outer first polymeric layer has a fifth metallized coating on the inner surface thereof, with the fifth metallized coating having the first bonding layer directly bonded thereto, and the outer second polymeric layer has a sixth metallized coating on the inner surface thereof, with the sixth metallized coating having the second bonding layer directly bonded thereto.

In an embodiment, the first air cellular assembly is present in a first internal reflective space having a low side emittance of up to 0.3 and a high side emittance of up to 0.3, and the second air cellular assembly is present in a second internal reflective space having a low side emittance of up to 0.3 and a high side emittance of up to 0.3.

In an embodiment, one of the first and second air-cellular films is a first formed air-cellular film and the other air-cellular film is a first unformed air-cellular film, and one of the first and second air cellular films is directly bonded to the first bonding layer, and one of the third and fourth air-cellular films is a second formed air-cellular film and the other is a second unformed air-cellular film, and one of the an unformed film, and one of the third and fourth air-cellular films is directly bonded to the second bonding layer; and the third air-cellular film is directly bonded to the fourth air-cellular film and one of the third and fourth air-cellular films is a formed film and the other air-cellular film is an unformed film, and the third air-cellular film is directly bonded to the second bonding layer and the second air-cellular film is directly bonded to the fourth bonding layer.

In an embodiment, the first metallized coating exhibits an emittance of up to 0.1, the second metallized coating exhibits an emittance of up to 0.1.

In an embodiment, the first metallized coating has a protective coating over an outer surface thereof, and the second metallized coating has a protective coating over an outer surface thereof.

In an embodiment, the first bonding layer comprises at least one member selected from the group consisting of olefin homopolymer, olefin copolymer, olefin/unsaturated ester copolymer, olefin/unsaturated acid copolymer, anhydride-modified polyolefin, and ionomer resin; and the second bonding layer comprises at least one member selected from the group consisting of olefin homopolymer, olefin copolymer, olefin/unsaturated ester copolymer, olefin/unsaturated acid copolymer, anhydride-modified polyolefin, and ionomer resin.

In an embodiment, the first bonding layer comprises a blend of linear low density polyethylene and low density polyethylene, and the second bonding layer comprises a blend of linear low density polyethylene and low density polyethylene.

In an embodiment, each of the bonding layers, and the thermoformed film, comprises a blend of linear low density polyethylene and low density polyethylene.

In an embodiment, each of the formed regions of the thermoformed film has a diameter of from 0.2 to 2 inches and a height of from 0.2 to 0.9 inch, or a diameter of from 0.3 to 3 inches and a height of from 0.2 to 1.5 inches, or a diameter of from 1 to 1.5 inches and a height of from 0.25 to 0.75 inch, or a diameter of from 1.2 to 1.3 inch diameter and a height of from 0.4 to 0.6 inch.

In an embodiment, the insulation laminate has a total polymeric thickness of from 7 to 20 mils, the insulation laminate has a total thickness of from 1.5 to 4 centimeters, and the insulation laminate exhibits an intrinsic normalized R-Value per inch of at least 2.9. Alternatively, the insulation laminate can have a total polymeric thickness of from 10 to 15 mils. In an embodiment, the insulation laminate can have an intrinsic normalized R-Value per inch of thickness of at least 3.0.

In an embodiment, the insulation laminate has a ratio of total polymeric thickness in mils to intrinsic normalized R-Value per inch of from 2.3:1 to 6.7:1. In an alternative embodiment, the insulation laminate has a ratio of total polymeric thickness in mils to intrinsic normalized R-Value per inch of from 3.3:1 to 5:1.

A third aspect is directed to a climate control duct surrounded by a multilayer insulation laminate according to the first and/or second aspects, above. The third aspect can employ any one or more of the above-described features and embodiments of the first and/or second aspects.

In an embodiment, the climate control duct further comprises a spacer between the multilayer insulation laminate and the duct, the spacer providing an air-filled gap between 0.25 inch and 1.25 inch between an inside surface of the multilayer insulation laminate and an outside surface of the duct. In an embodiment, the spacer provides a gap of 0.75 inch.

In an embodiment, the spacer and the multilayer insulation laminate provide insulation exhibiting an R-value of at least 7.96, or at least 8.0, or at least 8.1, or at least 8.2, or from 7.96 to 10.0, or from 7.96 to 9.0, or from 8.0 to 9.0, or from 8.1 to 9.0, or from 8.2 to 9.0.

BRIEF DESCRIPTION OF THE DRAWINGS

FIG. 4 is a schematic of a climate control duct surrounded by the multilayer insulation laminate, with the multilayer insulation laminate being separated from the duct by a plurality of spacers.

Figure 1:
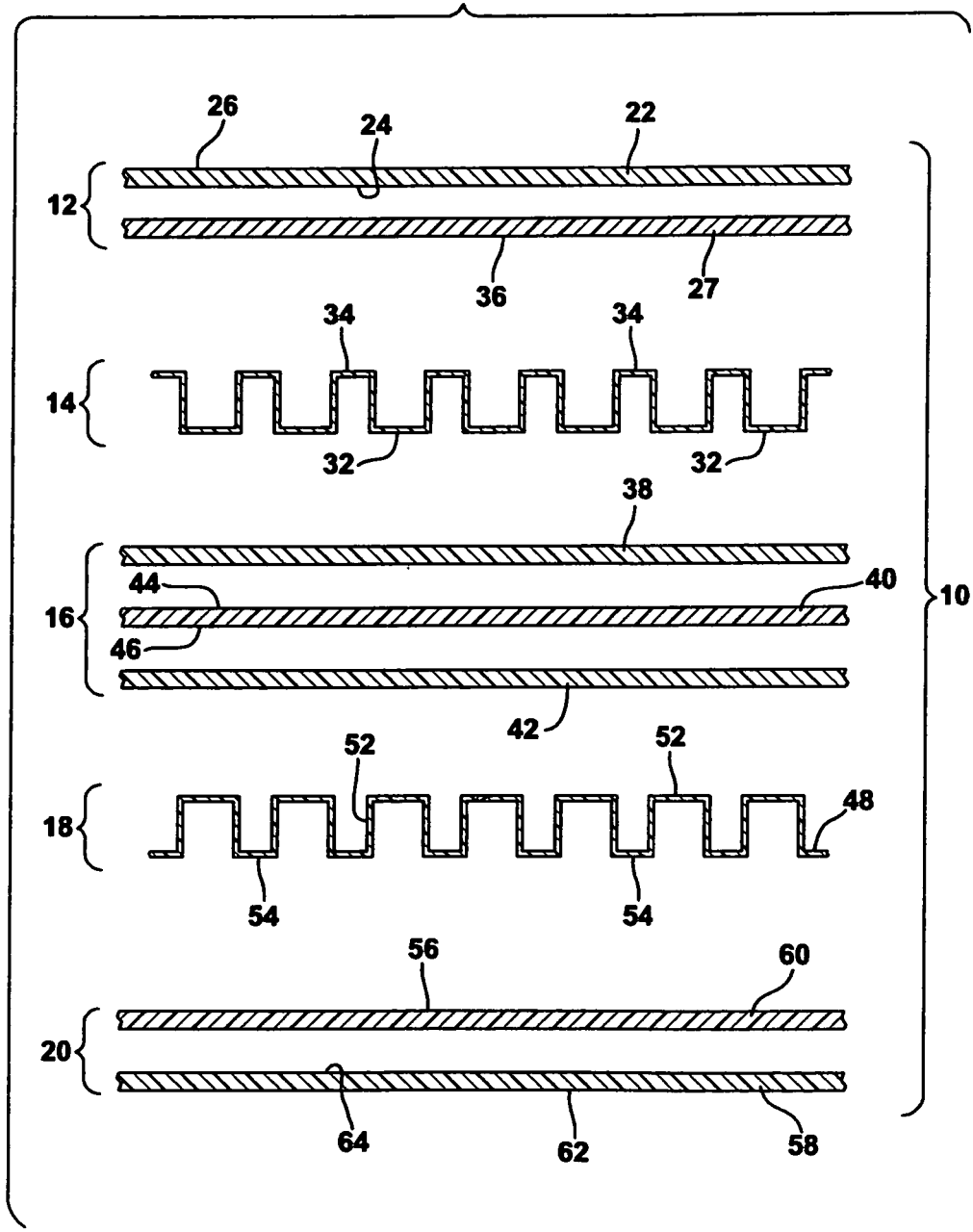
FIG. 1 is an exploded schematic of an embodiment of a multilayer insulation laminate.

DESCRIPTION OF PREFERRED
EMBODIMENTS

As used herein, the phrase "insulation laminate" refers to a multilayer structure designed to reduce or minimize heat transfer therethrough. The multiplicity of layers can include layers that are coextruded, extrusion coated, adhered together with adhesive, layers heat bonded together, heat welded together, etc. One or more layers can have a metallized coating thereon. One or more layers can be thermoformed, with a gas, such as air, trapped within a plurality of the formed regions which are sealed closed by adhering the unformed area of a formed film to a flat backing film.

As used herein, the term "polymeric layer" refers to a layer of the laminate that comprises at least one polymer. The polymeric layer can be coated with a metallized coating, e.g., a vapor deposited metal such as aluminum, gold, silver, etc. Typical polymeric layers that are metallized include polyethylene terephthalate ("PET"), polycarbonate, polyethylene, polyimide, polypropylene, etc.

As used herein, the phrase "outer polymeric layer" refers to polymeric layers having a metallized coating on an outer surface thereof. As used herein, the phrase "internal polymeric layer" (and "internal polymeric film") refers to a polymeric layer between two outer polymeric layers, in which the internal polymeric layer has one metallized surface or two metallized surfaces.

As used herein, the term "surface" as applied to a film or coating, refers to one of the two principal surfaces of every film. If, for example, Layer A has a second layer or a coating adhered to a "surface" of Layer A, then the second layer or coating is either in direct contact with Layer A, or there is only an adhesive between Layer A and the second layer or coating. On the other hand, as used herein, if for example Layer A has a second layer or coating on one "side" thereof, then the second layer or coating can be in direct contact with Layer A, or adhered to Layer A with an adhesive, or have one or more additional layers or coatings between Layer A and the second layer or coating.

As used herein, the terms "emissivity" and "emittance" are used interchangeably, i.e., as being equivalent to one another. These terms refer to the ratio of energy radiated by a particular object to energy radiated by a black body at the same temperature. As such, emissivity and emittance are unitless values. Thus, both emissivity and emittance are a measure of an object's ability to radiate absorbed energy. A true black body has an emissivity (or emittance) of 1, while any real object has an emissivity (or emittance) of less than 1 but greater than 0. Emittance, as used herein, is measured using ASTM C 1371-04A, "Standard Test Method for Determination of Emittance of Materials Near Room Temperature Using Portable Emissometers", ASTM International (2004), which is hereby incorporated, in its entirety, by reference thereto. In contrast, "Emissive power" is a somewhat related phrase and is sometimes confused with emittance and emissivity. However, in contrast to emittance and emissivity, emissive power is not a unitless ratio; rather, emissive power refers to the power emitted by an object, and is expressed in the units watts per square meter (i.e., $W/m^2$).

Unlike the measurement of thermal conducitivity, in use an insulation laminate can be installed in spaced relation from, for example, a duct, thereby providing an "effective R-Value" significantly greater than the intrinsic R-Value of the insulation laminate by itself, i.e., without the space between the insulation laminate and the duct. For example, an insulation laminate exhibiting an intrinsic R-Value measured according to ASTM C 518-04 of from, for example, about 2 to about 3.5, when installed around a duct using spacers to keep the insulation laminate spaced ¾ inch from the duct, exhibits an effective R-Value of up to 8.5, measured according to ASTM C 335-05ae1, "Standard Test Method for Steady-State Heat Transfer Properties of Pipe Insulation", ASTM International (2005), which is hereby incorporated, in its entirety, by reference thereto.

As used herein, the phrase "reflective space" refers to a region inside of a multilayer insulation laminate (i.e., an internal region) that is bounded by metallized surfaces on each side. Every reflective space within a multilayer laminate has a "high side emittance" and a "low side emittance". The "high side emittance" of the internal region (i.e., of the reflective space) is the side exhibiting the higher emittance level as measured by ASTM C 1371-04A. The "low side emittance" is the side of the internal region exhibiting the lower emittance level as measured by ASTM C 1371-04A. High and low side emittance values in a multilayer laminate can be determined by measuring the emittance of both sides of various components of the laminate, such as is provided in Table 1, below.

The mutilayer insulation laminate can have one or more internal reflective spaces in which each reflective space contains an air-cellular assembly.

As used herein, the term "outer" refers to a component (or a surface of a component) that provides, or is positioned toward, or is oriented toward, an outside surface of the laminate, i.e., toward an outermost surface of the laminate. One component or surface can be provided, positioned toward, or oriented, "outward" relative to another surface, hence "inner" and "outer" surfaces of a component film within the laminate.

As used herein, the term "inner" refers to a component (or a surface of a component) that contains, is positioned toward, or is oriented toward, the cross-sectional center of the laminate. A component or surface can be "inner" relative to another surface which is deemed relatively "outer", as described above. Moreover, a first component is positioned on an "inner side" of a second component if the first component is located closer to the center of the multilayer structure than the second component, regardless of whether the first component is directly adhered to the second component or is spaced therefrom with one or more additional components therebetween. The phrase "outer side" has an analogous meaning.

As used herein, the term "metallized" refers to a surface (usually a surface of a polymeric film) that has had metal atoms coated onto one or more surfaces thereof. With respect to metallized coatings, the term "coating" and "layer" are used interchangeably, as a coating refers to the method by which the metallized layer is deposited on a polymeric film. The polymeric film providing the surface to be coated is preferably polyester, and the metal is preferably aluminum. The metallized coating on the film can have a thickness of from 200 to 15,000 Angstroms. Vapor deposition is a preferred means for providing a metallized coating on a substrate film.

As described herein, layers that are adhered to one another with adhesive have a thin adhesive layer therebetween, and layers described as having one or more metallized surfaces have one or more very thin metallic layers thereon. Typically, a layer of adhesive used to adhere two flexible films to one another is very thin. For example, flexible thermoplastic films used in insulation products typically have a thickness within the range of from 0.5 to 5 mils. However, such films can be adhered to one another (or film layers laminated to one another) using adhesive layer having a thickness of from 0.05 to 0.15 mil, more commonly 0.08 to 0.10 mil. Thus, it is common for the flexible thermoplastic film to have a thickness of from 5 to 50 times as thick as the thickness of the adhesive layer used to adhere two films to one another.

As used herein, the phrases "direct bond" and "directly bonded" refer to any bond of one component to another that does not employ an adhesive to achieve the bond. The bond can be a thermal bond, thermal weld, chemical weld, or a bond formed by charged surfaces that are attracted to one another and held together through static bonding. Preferred methods for forming direct bonds include extrusion coating and the heating solidified layers to produce a direct thermal bond using heat and pressure. As used herein, a "direct bond to a metallized coating" includes a direct bond to a protective coating (e.g. lacquer) over the metallized coating.

As used herein, the phrase "bonding layer" refers to a layer provided so that a thermal bond can be made directly thereto. Typically, a bonding layer comprises polyolefin, such as ethylene homopolymer or ethylene copolymer, particularly ethylene/alpha-olefin copolymer such as linear low density polyethylene, low density polyethylene, very low density polyethylene, homogeneous ethylene/alpha-olefin having a density of from 0.86 to 0.94 (including Exact® linear homogeneous ethylene/alpha-olefin copolymer from Exxon and Affinity® substantially linear homogeneous ethylene/alpha-olefin copolymer having limited long chain branching, supplied by The Dow Chemical Company). A bonding layer can be bonded directly to a PET layer or directly to a metallized coating on a PET layer. A bonding layer can be extrusion coated directly onto a metallized coating on a PET film, bonding to the metallized coating without the need to use an adhesive.

As used herein, the phrase "air-cellular assembly" refers to films adhered together with gas trapped between them, such as with Bubble Wrap® cellular cushioning, as well as inflated products such as New Air IB® cushioning material, and the like. Cellular cushioning and a process for making same is disclosed in U.S. Pat. No. 3,346,438, entitled "Method and Apparatus for Making Cushioning and Insulating Material", which is hereby incorporated, in its entirety, by reference thereto. This type of cellular cushioning comprises an air cellular assembly of a thermoformed film having a plurality of discrete formed regions separated by an unformed land area with a backing film that is adhered to the land area of the thermoformed film and discrete gas-filled cells between the formed regions of the thermoformed film and the backing film. The backing film can be a flat, unformed film, or can also be thermoformed with discrete formed areas, producing a doubled cellular structure. A bonding layer can serve as a backing film in the air-cellular assembly.

Inflatable cushioning material is disclosed in U.S. Pat. No. 6,800,162, entitled "Integrated Process for Making Inflatable Article", which is hereby incorporated, in its entirety, by reference thereto. While the air-cellular assembly can have one thermoformed sheet bonded or adhered to a second film that is either flat (i.e., unformed) or a thermoformed sheet, alternatively neither sheet need be thermoformed, as in New Air IB® cushioning material from Sealed Air Corporation. As used herein, the phrase "air cellular film" refers a film which is used as a component of an air-cellular assembly. Such an air cellular film includes thermoformed films as well as unformed backing films.

As used herein, the term "adhered" refers to two components affixed to one another with a thermal bond, and/or through the use of an adhesive. Components thermally bonded to one another can be bonded by heat, pressure, or a combination of heat and pressure. Moreover, layers and other components may be directly adhered to one another, i.e., directly bonded without adhesive or any other component therebetween. Alternatively, components adhered to one another with an adhesive may are indirectly adhered to one another, e.g., separated by at least one adhesive layer, or separated by one or more additional layers or additional components. Moreover, components can be adhered to one another throughout the entirety of their facing surfaces, or substantially throughout the entirety of their facing surfaces, or can be adhered to one another over any partial fraction of their surfaces facing one another with thermal bonding, welding, adhesive, etc. Thermal bonding, thermal welding, or adhesive bonding can be provided with the spots being in any shape, size, or pattern desired.

While in one embodiment the multilayer insulation laminate does not comprise a fire retardant, in another embodiment the multilayer insulation laminate comprises a fire retardant.

Various multilayer arrangements of the multilayer insulation laminate include layer arrangements (I)-(VIII), wherein: $PET_1$=outer first polymeric layer, $PET_2$=outer second polymeric layer, $TF_1$=first thermoformed film, $TF_2$=second thermoformed film, $BL_1$=first bonding layer; $BL_2$=second bonding layer, $BL_3$=third bonding layer, $BL_4$=fourth bonding layer, $BL_5$=fifth bonding layer; $M_1$=first metallized coating, $M_2$=second metallized coating, $M_3$=third metallized coating, $M_4$=fourth metallized coating, $M_5$=fifth metallized coating, $M_6$=sixth metallized coating, $PET_3$=first internal polymeric film, $PET_4$=second internal polymeric film. While it is preferred that no adhesive layers are present in the multilayer laminate, one or more adhesive layers can be utilized between metallized layers and bonding layers, between outer polymeric layers and bonding layers, between internal polymeric layers and bonding layers, between thermoformed layers and internal polymeric layers, and between thermoformed layers and bonding layers. Optionally, but preferably, $M_1$ and/or $M_2$ have a protective coating thereover, e.g., lacquer (not illustrated below).

$$M_1/PET_1/M_3/BL_1/TF_1/BL_2/PET_2/M_2 \quad (I)$$

$$M_1/PET_1/M_4/BL_1/TF_1/BL_2/M_3/PET_2/M_2 \quad (II)$$

$$M_1/PET_1/BL_1/TF_1/BL_3/M_3/PET_3/BL_2/PET_2/M_2 \quad (III)$$

$$M_1/PET_1/BL_1/M_3/PET_3/TF_1/BL_2/PET_2/M_2 \quad (IV)$$

$$M_1/PET_1/BL_1/TF_1/BL_3/M_3/PET_3/M_4/BL_4/BL_2/PET_2/M_2 \quad (V)$$

$$M_1/PET_1/BL_1/TF_1/BL_3/M_3/PET_3/M_4/BL_4/TF_2/BL_2/PET_2/M_2 \quad (VI)$$

$$M_1/PET_1/M_5/BL_1/TF_1/BL_3/M_3/PET_3/M_4/BL_4/TF_2/BL_2/M_6/PET_2/M_2 \quad (VII)$$

$$M_1/PET_1/M_5/BL_1/TF_1/BL_3/M_3/PET_3/BL_5/PET_4/M_4/BL_4/TF_2/BL_2/M_6/PET_2/M_2 \quad (VIII)$$

FIG. 1 is an exploded schematic illustration of an embodiment of the multilayer insulation laminate. For simplicity, FIG. 1 does not illustrate either the adhesive layers, the very thin layers of metal on the layers described as having one or more metallized surfaces, or the thin protective coating often provided over the metallized surface, e.g., a protective lacquer coating.

FIG. 1 is an exploded schematic view of an embodiment of the multilayer insulation laminate. In FIG. 1, first outer film 12 includes outer first polymeric layer 22 having inner surface 24 and outer surface 26. Outer surface 26 has a first metallized coating thereon (not illustrated), i.e., a very thin layer of vapor-deposited metal on the outside surface 26 of polymeric layer 22. A thin protective coating (also not illustrated), such as lacquer, is optionally (but preferably) provided over the first metallized coating, i.e., so that the metallized coating is between polymeric layer 22 and the protective coating. The protective coating prevents the metallized layer from oxidizing. Oxidation of the metal causes a loss of the reflective character of the metallized layer, with the resulting oxidation producing an oxide powder that loses its bond with polymeric layer 22. Optionally, first outer film 12 can be metallized on two sides, i.e., on both outside surface 26 and on inside surface 24. The metallized coating on inside surface 24 need not have a protective coating thereover, as this metallized coating is protected from oxidation by being directly bonded to first bonding layer 27 of first outer film 12.

Second outer film 20 includes outer second polymeric layer 58 having outer surface 62 and inner surface 64. Outer surface 62 has a metallized coating thereon (not illustrated). As with first outer film 12, the metallized coating on outer surface 62 is a very thin layer of vapor-deposited metal present on outer surface 62 of second polymeric layer 58. As with the first metallized coating on first outer film 12, a protective coating (not illustrated) can be provided over the second metallized coating so that the second metallized coating is between outer surface 62 and the protective coating. Optionally, second polymeric layer 58 can be two-side metallized, i.e., both outer surface 62 and inner surface 64 can have a metallized coating thereon. As with first outer film 12, a metallized coating on inner surface 64 need not have a protective coating thereover, as this metallized coating is protected from oxidation by being directly bonded to second bonding layer 60 of second outer film 20

First thermoformed film 14 has a plurality of formed regions 32 thereon, with flat land areas 34 therebetween. Upon thermoforming, flat land areas 34 are thermally bonded (i.e., direct thermal bonding, or heat welding) to the inner surface 36 of first bonding layer 27.

Second thermoformed film 18 has a plurality of formed regions 52 thereon, with flat land areas 54 therebetween. Upon thermoforming, flat land areas 54 are thermally bonded (i.e., direct thermal bonding, or heat welding) to the inner surface 56 of second bonding layer 60.

Internal multilayer film 16 includes third bonding layer 38, internal polymeric film 40, and fourth bonding layer 42. Internal polymeric film 40 has first surface 44 which has a metallized coating thereon (not illustrated) and second surface 46 which also has a metallized coating thereon (also not illustrated). While first internal bonding layer 38 can be adhesively bonded to the metallized coating on first surface 44 of internal polymeric film 40, preferably internal bonding layer is directly bonded to the metallized coating on first surface 44 of internal polymeric film 40 without the use of an adhesive, e.g., via extrusion coating. Similarly, second internal bonding layer 42 can be adhesively bonded, or directly bonded, to the metallized coating on second surface 46 of internal polymeric film 40.

In the multilayer insulation laminate, the outer first and second metallized coatings, and the third metallized layer, are polymeric substrate layers having a metallized coating on at least one surface thereof. The various metallized coatings can be prepared by known production methods, such as the evaporation of a molten metal (such as aluminum, silver, and/or gold) into a vacuum with the vaporized metal depositing on the surface of the polymeric substrate film (such as polyester, polyethylene, etc). The metallized coating can be metallized aluminum. The polymeric layer having one or more surfaces having metallized coating thereon can be a polyethylene terephthalate ("PET") substrate with an aluminum coating thereon. One such film is a 48 gauge PET with a metallized aluminum coating on one or both surfaces thereof. While internal polymeric film 40 is metallized on both sides thereof, and the outer first and second metallized layers are metallized on their respective outer surfaces, one or both of the outer first and second layers can optionally be metallized on both sides thereof, i.e., metallized on their inner surfaces.

The multilayer insulation laminate can have a thermal conductivity of up to 0.35 Btu·in/ft$^2$·hr·° F. as measured by ASTM C 518-04, entitled "Standard Test Method for Steady-State Thermal Transmission Properties by Means of the Heat Flow Meter Apparatus", ASTM International (June 2004), which is hereby incorporated, in its entirety, by reference thereto. Alternatively, the multilayer insulation laminate can have a thermal conductivity of up to 0.34 Btu·in/ft$^2$·hr·° F., or up to 0.33 Btu·in/ft$^2$·hr·° F., or up to 0.32 Btu·in/ft$^2$·hr·° C., as measured by ASTM C 518-04. Alternatively, the multilayer insulation laminate can have a thermal conductivity of from 0.275 to 0.34 Btu·in/ft²·hr·° F., or from 0.28 to 0.33 Btu·in/ft²·hr·° F., or from 0.29 to 0.32 Btu·in/ft²·hr·° F., as measured by ASTM C 518-04.

Retention and/or preservation of the very thin metallized coating on the outer surface of the outer first metallized layer and the outer surface of the outer second metallized layer can be enhanced by providing an outer protective coating over the metallized coating. For example, a lacquer coating can be provided over the metallized coating on the outer surface of the outer first metallized layer and the outer surface of the second metallized layer. The protective coating should be as transparent as possible to infrared energy while providing the desired level of protection of the metallized layer. Various manufacturers of metallized films provide a protective coating over the metallized coating, i.e., so that the metallized coating is between the substrate (e.g., PET) and the protective coating.

One or more of (i) the first internal bonding layer of the multilayer internal film, (ii) the second internal bonding layer of the multilayer internal film, (iii) the first backing film of the first air-cellular assembly, (iv) the second backing film of the second air-cellular assembly, (vii) the first formed film of the first air-cellular assembly, and (viii) the second formed film of the second air-cellular assembly, can be made from any one or more of a wide variety of polymers capable of being heat bonded, welded, heat-laminated, and/or heat-sealed) to one another. Such polymers include, for example, olefin homopolymer, olefin copolymer, olefin/unsaturated ester copolymer, olefin/unsaturated acid copolymer, anhydride-modified polyolefin, ionomer resin, polyamide, polyester, etc.

One or more of (i) the bonding layer of the first outer film, (ii) the bonding layer of the second outer film, (iii) the first internal bonding layer of the internal film, (iv) the second internal bonding layer of the internal film, (iv) the first backing film of the first air-cellular assembly, (v) the second backing film of the second air-cellular assembly, (vi) the first formed film of the first air-cellular assembly, and (vii) the second formed film of the second air-cellular assembly, can be made from a blend of linear low density polyethylene ("LLDPE") and low density polyethylene ("LDPE"). The blend can contain from 60 to 95 weight percent LLDPE with from 40 to 5 weight percent LDPE, or from 70 to 90 weight percent LLDPE with 30-10 weight percent LDPE, or from 75 to 85 weight percent LLDPE with 25 to 15 weight percent LD, or 80 weight percent LLDPE with 20 weight percent LDPE.

Each of the air-cellular assemblies can contain an unformed backing film bonded to a formed film, i.e., a thermoformed film. While an adhesive can be used to bond the backing film to the formed film, the backing film can be thermally bonded to the land areas of the formed film. That is, the backing film can be thermally bonded directly to the unformed area (or areas) of the formed film.

The formed films have a plurality of formed regions for holding air that is trapped is discrete cells between the formed film and the backing film. Each of the trapped pockets of air is referred to as an "air cell". Hence, a backing film bonded to a formed film with trapped pockets of air is herein referred to as an "air-cellular assembly". Bubble Wrap™ cellular cushioning is an example of an air-cellular assembly. The formed regions in the formed film can be of any desired size and shape, but preferably are relatively large and relatively high in order to provide the multilayer insulation laminate with enough thickness to provide the multilayer insulation laminate with lower thermal conductivity. The air cellular assembly in the insulation laminate can have the backing layer positioned inward of it associated formed film, or outward of its associated formed film. In the embodiment of FIG. 1, the backing layers are positioned outward of the formed films in each of the air-cellular assemblies.

Each of the formed regions in the first and second formed films can be thermoformed to produce air cells having a diameter of 0.7 to 1.7 inches, or a diameter of 0.8 to 1.6 inches, or a diameter of from 0.9 to 1.5 inches, or a diameter of from 1 to 1.25 inches. Each of the formed regions in the first and second formed films can be thermoformed to a height of from 0.2 inch to 1 inch, or a height of from 0.3 to 0.9 inch, or a height of from 0.5 to 0.8 inch, or a height of from 0.62 to 0.72 inch, or a height of about 0.67 inch. Each of the formed regions in the first and second formed film can be thermoformed to a diameter of 0.9 to 1.5 inches and a height of from 0.3 to 0.9 inch, or a diameter of from 1 to 1.4 inch and a height of from 0.5 inch to 0.8 inch, or a diameter of 1.2 to 1.3 inch and a height of from 0.62 inch to 0.72 inch, or a diameter of about 1.25 inch and a height of about 0.67 inch.

The formed regions in the formed films can be spaced in close proximity to one another, in order to minimize air convection in the multilayer insulation laminate. The formed regions can be spaced within from 0.02 to 0.3 inch of one another, or from 0.04 to 0.25 inch of one another, or from 0.06 to 0.15 inch from one another, or from 0.08 to 0.12 inch from one another, or from 0.09 to 0.11 inch from one another, or 0.1 inch from one another. If the formed regions have a circular footprint, these spacing distances refer to the closest proximity of one footprint to an adjacent footprint.

In the event that the formed regions have an overall cylindrical shape, the sidewall of the formed region can be circular in cross-section with the top of the formed region being flat. However, the transition between the sidewall and the top of the formed region can have a radius of from 0.1 to 0.5 inch, or from 0.2 to 0.4 inch, or from 0.25 to 0.35 inch, or about 0.31 inch.

The first and second formed films may have any desired thickness, but can have a thickness (i.e., in the land areas, i.e., the area between the formed areas) of from 1 to 3 mils, or from 1.2 to 2.8 mils, or from 1.4 to 2.6 mils, or from 1.6 to 2.4 mils, or from 1.8 to 2.2 mils, or about 2 mils.

The first and second backing films may have any desired thickness, but can have a thickness of from 0.5 to 4 mils, 0.7 to 3.3 mils, or from 1 to 3 mils, or from 1.2 to 2.8 mils, or from 1 to 2 mils, or from 1.2 to 1.8 mils, or from 1.4 to 1.6 mils, or about 1.5 mils. One or both of the first and second backing films can be flat films, i.e., without thermoformed regions. Alternatively, one or both of the first and second backing films can have one or more thermoformed regions. A thermoformed backing film can have land areas that fully or partially correspond with the land areas of the formed film to which the backing film is bonded.

The various films and layers of the multilayer insulation laminate can be adhered to one another using thermal bonding, heat welding and/or using an adhesive. The first outer film can be adhered to the first air-cellular assembly with an adhesive, and the second outer film can be adhered to the second air-cellular assembly with an adhesive. Although an adhesive can be used to adhere any two, three, four, or even all five of the subcomponents to one another, various subcomponents can alternatively be directly bonded to one another with heat, i.e., thermal bonding or heat welding. However, the adhesion of metallized surfaces to bonding layers is carried out with direct bonding, i.e., without the use of an adhesives. Moreover, the formed films of the air-cellular assemblies are preferably directly bonded to the backing films of the air-cellular assemblies.

The first bonding layer of the multilayer internal film can be directly bonded (or adhered with an adhesive) to discrete portions of the first formed film of the first air-cellular assembly, with the first backing film of the first air-cellular assembly being directly bonded (or adhered with an adhesive) to the first outer film. The second bonding layer of the multilayer internal film can be directly bonded (or adhered with an adhesive) to discrete portions of the second formed film of the second air-cellular assembly, with the second backing film of the second air-cellular assembly being directly bonded (or adhered with an adhesive) to the second outer film.

Alternatively, the first bonding layer of the multilayer internal film can be directly bonded (or adhered with an adhesive) to the first backing film of the first air-cellular assembly, in which case discrete portions of the first formed film of the first air-cellular assembly can be directly bonded (or adhered with an adhesive) to the first outer film. The second bonding layer of the multilayer internal film can be directly bonded (or adhered with an adhesive) to the second backing film of the second air-cellular assembly, in which case discrete portions of the second formed film of the second air-cellular assembly can be directly bonded (or adhered with an adhesive) to the second outer film.

The insulation laminate can have a total polymer thickness of from 6 to 25 mils, or from 7 to 22 mils, or from 8 to 20 mils, or from 9 to 18 mils, or from 10 to 16 mils, or from 11 to 14 mils, or from 12 to 13 mils.

The insulation laminate can have a total thickness of from 1 to 7 centimeters, or from 1.3 to 6 centimeters, or from 1.6 to 5 centimeters, or from 1.8 to 4 centimeters, or from 2-3 centimeters, or from 2.2 to 2.7 centimeters, or from 2.4 to 2.6 centimeters. The total thickness of the insulation laminate is determined by summing the formed depth of each of the thermoformed films of the air-cellular assemblies, plus the thickness of each additional film present in the laminate.

The insulation laminate can exhibit an intrinsic R-value (calculated as the inverse of thermal conductivity, which is measured in accordance with ASTM C 518-04) of from 2.8 to 4, or from 2.9 to 3.5 or from 2.9 to 3.4, or from 2.9 to 3.3. The intrinsic R-value is the R-value measured for the insulation laminate itself, as opposed to the insulation laminate installed over a duct with spacers keeping the insulation laminate spaced apart from the duct.

The insulation laminate can exhibit an R value of at least 2.8, or an R value of from 2.8 to 3.5, or an R value of at least 2.9, or an R value of from 2.9 to 3.3. The insulation laminate can have an R-value within any one of the ranges above, in combination with a total polymer thickness of from 6 to 25 mils, or from 7 to 22 mils, or from 8 to 20 mils, or from 9 to 18 mils, or from 10 to 16 mils, or from 11 to 14 mils, or from 12 to 13 mils.

The insulation laminate can have a ratio of total polymer thickness (in mils) to intrinsic R-value, of from 6:2.8 to 25:4 (i.e., 2.14 to 6.75), or from 8:2.9 to 22:3.5 (i.e., 2.76 to 6.27), or from 10:2.9 to 20:3.4 (i.e., 3.45 to 5.89), or from 13:3.3 to 12:2.9 (i.e., 3.94 to 4.14). For example, the insulation laminate of working Example 9 (below) exhibits an actual intrinsic R-value of 3.27 (while the "normalized" intrinsic R-value per inch in Table 4 is 3.27, the actual thickness was approximately one inch, making the normalized intrinsic R-value equal to the actual intrinsic R-value), a total polymer thickness of 13.5 mils (determined by totaling the thickness of all of the components listed in Table 1 for each of the layer descriptions listed for working Example 4 in Table 3), and hence has a ratio of total polymer thickness (13.5 mils) to R value (R=3.27) of 13.5÷3.27=4.13.

The climate control duct can further comprise a spacer between the multilayer insulation laminate and the duct. The spacer can provide an air-filled gap of from 0.25 to 1.25 inch between the inside surface of the multilayer insulation laminate and the outside surface of the duct. Alternatively, the spacer can provide an air-filled gap of from 0.12 to 1.25 inches, or from 0.5 to 1 inch, or from 0.6 to 0.9 inch, or from 0.7 to 0.8 inch, or about 0.75 inch.

Figure 2A:
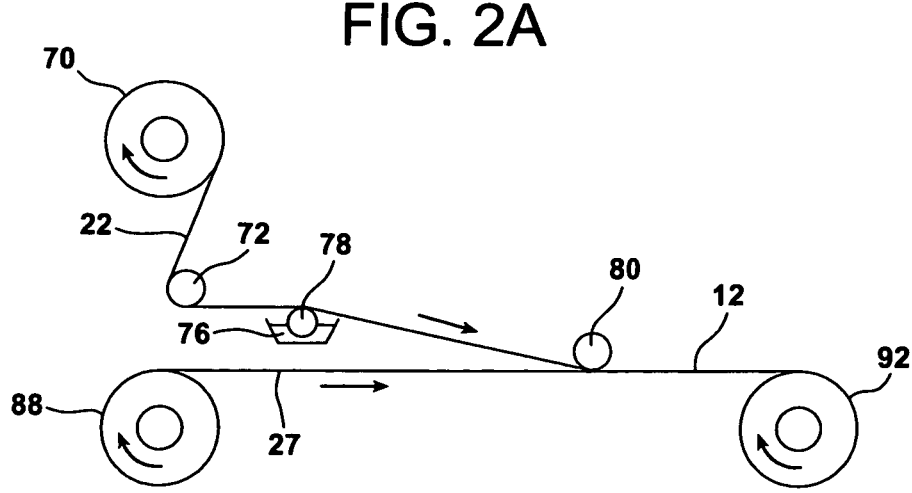
FIG. 2A is a schematic of a first stage of a multistage process of preparing the multilayer insulation laminate of FIG. 1.
Figure 2B:
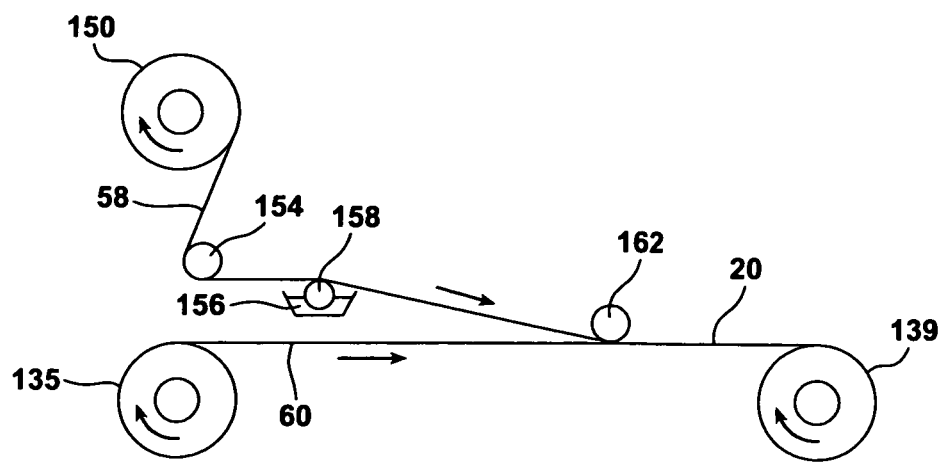
FIG. 2B is a schematic of a second stage of a multistage process of preparing the multilayer insulation laminate of FIG. 1.
Figure 2C:
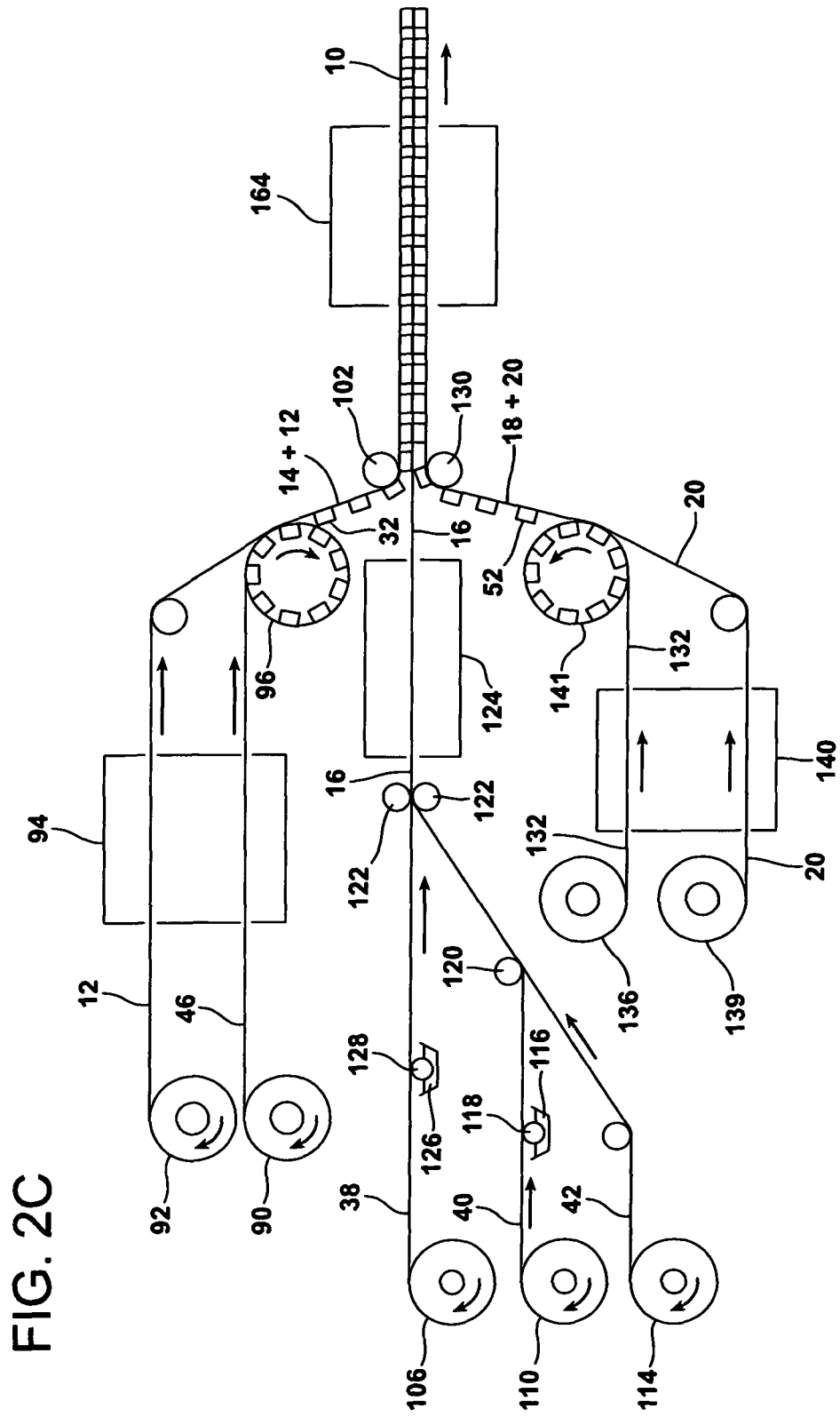
FIG. 2C is a schematic of a third stage of a multistage process of preparing the multilayer insulation laminate of FIG. 1.

FIGS. 2A, 2B, and 2C are schematic illustrations of respective stages of a multi-stage process for making a multilayer insulation laminate 10 in accordance with the present invention. FIG. 2A illustrates a first stage of the process in which first outer polymeric layer 22 is provided from roll of film 70, with first outer polymeric layer 22 passing in partial wrap around guide roller 72 and thereafter having lamination adhesive 76 applied to the inside surface thereof by contact with adhesive application roller 78, after which first outer polymeric layer 22 merges into contact with first bonding layer 27 (supplied from roll of film 88) at guide roller 80, to produce multilayer first outer film 12. Adhesive 76 can be of any type suitable for bonding films together. However, Primabond® 3250 adhesive in Table 2, below, is a preferred adhesive for the lamination of first outer polymeric layer 22 to bonding layer 27. The resulting multilayer first outer film 12 is wound up to form roll of film 92.

First outer film 12 has a metallized coating (not illustrated) on the outside surface of first outer polymeric layer 22, i.e., on the surface of outer polymeric layer 22 which faces away from first bonding layer 27. First outer polymeric layer 22 of first outer film 12 is preferably a polyester film (e.g., polyethylene terephthalate). The metallized coating is preferably a vapor-deposited aluminized coating. Furthermore, the metallized coating has a protective coating (not illustrated) over the outside surface thereof. The protective coating on the outside surface of the metallized coating can be a lacquer. Optionally, first outer film 12 can be a "bi-metallized" film, i.e., with the polymeric layer having a metallized coating on each surface thereof, e.g., aluminized coatings on both the inside and outside surfaces thereof. In Examples 1-6 below, each multilayer first outer film was made in accordance with FIG. 2A, in that first outer polymeric layer 22 was laminated to first bonding layer 27 with adhesive.

Alternatively, in place of a lamination process utilizing an adhesive, multilayer first outer film 12 can be produced by extrusion coating first bonding layer 27 onto first outer polymeric layer 22 (i.e., using an extrusion coating process, not illustrated), to directly bond first bonding layer 27 to first outer polymeric layer 22. Examples 7-9, below, were made without adhesive, by extrusion coating bonding layer 27 onto first outer polymeric layer 22. Reduced thermal conductivity has been obtained without using adhesive, i.e., by extrusion coating first bonding layer 27 onto first outer polymeric layer 22.

While a first side of first bonding layer 27 can be adhesively adhered to first polymeric layer 22 with an adhesive, or directly bonded to first outer polymeric layer 22 via extrusion coating, the second side of first bonding layer 27 is thermally bonded to thermoformable film 46, supplied from roll of film 90. More particularly, the bonding layer side of first outer film 12 is directly bonded to thermoformable film 46 after thermoformed film 46 has contacted forming roller 96 and been thermoformed to produce thermoformed film 14 (see FIGS. 1 and 2C, together). The lamination of first outer film 12 to thermoformed film 14 produces first air cellular assembly (14+12 in FIG. 2C). First outer film 12 is directly bonded to land areas 34 of thermoformed film 14. The heat for this lamination is provided by passing first outer film 12 and thermoformable film 46 through heater 94, as illustrated in FIG. 2C. While this bonding could have been performed with either adhesive bonding or direct bonding, it is preferred that a direct bond is made between first outer film 12 and thermoformed film 14. As such, polyolefin is a preferred polymer for bonding layer 87, particularly a blend of linear low density polyethylene and low density polyethylene.

FIG. 2B illustrates a second stage of the process in which second outer polymeric layer 58 is provided from roll of film 150, with second outer polymeric layer 58 passing in partial wrap around guide roller 154 and thereafter having lamination adhesive 156 applied to the inside surface thereof by contact with adhesive application roller 158, after which second outer polymeric layer 58 merges into contact with second bonding layer 60 (supplied from roll of film 135) at guide roller 162, to produce multilayer second outer film 20, which is rolled up to form roll of film 139. Adhesive 156 can be of any type as discussed above for the adhesion of first outer polymeric film 12 to first bonding layer 87. The resulting multilayer second outer film 138 is wound up to form roll of film 139.

As with first outer film 12, second outer film 20 also has a metallized coating (not illustrated) on the outside surface of second outer polymeric layer 58, i.e., on outer surface 62 of second outer polymeric layer 58, i.e., the surface facing away from second bonding layer 134. As with first outer polymeric layer 22, second outer polymeric layer 58 is preferably a polyester film, and the metallized coating is preferably a vapor-deposited aluminized coating, with a protective coating over the outside surface thereof. Optionally, second outer film 20 can be bi-metallized, as with first outer polymeric film 12. In Examples 1-6 below, each multilayer second outer film was made in accordance with FIG. 2A, in that second outer polymeric layer 58 was laminated to second bonding layer 60 using a adhesive lamination. However, in Examples 7-9, below, second bonding layer 60 was extrusion coated onto second outer polymeric layer 58, to produce second outer film 20.

Both first outer film 12 (supplied from roll of film 92) and first thermoformable film 46 (supplied from roll of film 90) are passed through heater 94, with thermoformable film 46 thereafter contacting and being thermoformed on forming roller 96. See FIG. 2C. The bonding layer side of first outer polymeric film 12 is laminated (via direct, thermal bonding) to film 46 after film 46 is thermoformed on forming roller 96, to form first thermoformed film 14 (see FIGS. 1, 2A, and 2C). The resulting lamination forms a first air cellular assembly (designated 14+12 in FIG. 2C). First outer film 12 is thermally bonded (i.e., directly bonded) to land areas 34 of thermoformed film 14. First air cellular assembly 14+12 has a plurality of discrete air cells between films 12 and 14. While this bonding could have been performed with either adhesive or direct bonding (i.e., thermal bonding or heat welding), it is preferred that a direct bond is made between first outer polymeric film 12 and thermoformed film 14, to minimize thermal conductivity of the resulting laminate. Accordingly, polyolefin is a preferred polymer for first bonding layer 27. A blend of linear low density polyethylene and low density polyethylene is particularly preferred for bonding layer 27.

Similarly, as illustrated in FIG. 2C, second outer film 20 (supplied from roll of film 139) and second thermoformable film 132 (supplied from roll of film 136) are passed through heater 140, with thermoformable film 132 thereafter contacting and being thermoformed on forming roller 141. The bonding layer side of second outer polymeric film 20 is laminated (via direct, thermal bonding) to film 132 after film 132 is thermoformed on forming roller 141, to form second thermoformed film 18 (see FIGS. 1, 2B, and 2C). The resulting lamination forms a second air cellular assembly (designated 18+20 in FIG. 2C). Second outer film 20 is thermally bonded (i.e., directly bonded) to land areas 54 of thermoformed film 18. Second air cellular assembly 18+20 has a plurality of discrete air cells between films 18 and 20. As with the first air cellular assembly 14+12, the bonding of second outer film 20 to the land areas 54 of second thermoformed film 18 can be preformed with adhesive or direct bonding, but preferably the bonding is direct, i.e., using thermal bonding or heat welding. Accordingly, polyolefin is a preferred polymer for second bonding layer 60. A blend of linear low density polyethylene and low density polyethylene is particularly preferred for second bonding layer 60.

Forming rollers 96 and 141 have cavities therein, with forming films 46 and 132 passing in partial wrap therearound while hot, with portions of forming films 46 and 132 being drawn into the cavities in forming rollers 96 and 141, respectively. Vacuum is used to draw discrete portions of hot films 46 and 132 into the cavities of forming rollers 96 and 141.

The preparation of multilayer internal film 16 includes the adhesion of third bonding layer 38, and fourth bonding layer 42, to internal metallized film 40. Third bonding layer 38 is supplied from roll of film 106. Internal metallized film 40, which can be one-side metallized (but preferably is two-side metallized), is supplied from roll of film 110. Fourth bonding layer 42 is supplied from roll of film 114. Internal metallized film 108 is unwound from roll of film 110 and passes over adhesive application roller 118, which applies adhesive 116 thereto. Internal metallized film 108, now with adhesive on one side thereof, contacts and adheres to fourth bonding layer 42 at roller 120.

Third bonding layer 38, supplied from roll-of-film 106, passes over adhesive application roller 128, which applies adhesive 126 to the side of third bonding layer 38 facing internal metallized film 40. Thereafter, third bonding layer 38 is brought into contact with and adhered to internal metallized film 40 which has fourth bonding layer 42 adhered to the other side thereof. At nip rollers 122, third bonding layer 38 contacts the already combined metallized film 40 adhered to fourth bonding layer 42, to produce internal multilayer film 16.

Thereafter, first air cellular assembly 14+12, internal multilayer film 16, and second air cellular assembly 18+20 merge together and contact one another between rollers 102 and 130. See FIG. 2C. Once together, first air cellular assembly 14+12, internal multilayer film 16, and second air cellular assembly 18+20 remain in contact with one another as they pass through heater 164, which causes the tops of formed regions 32 of first thermoformed film 14 to thermally bond to the outer surface of third bonding layer 38, and formed regions 52 of second thermoformed film 18 to thermally bond the outer surface of fourth bonding layer 42, resulting in multilayer insulation laminate 10.

Figure 3:
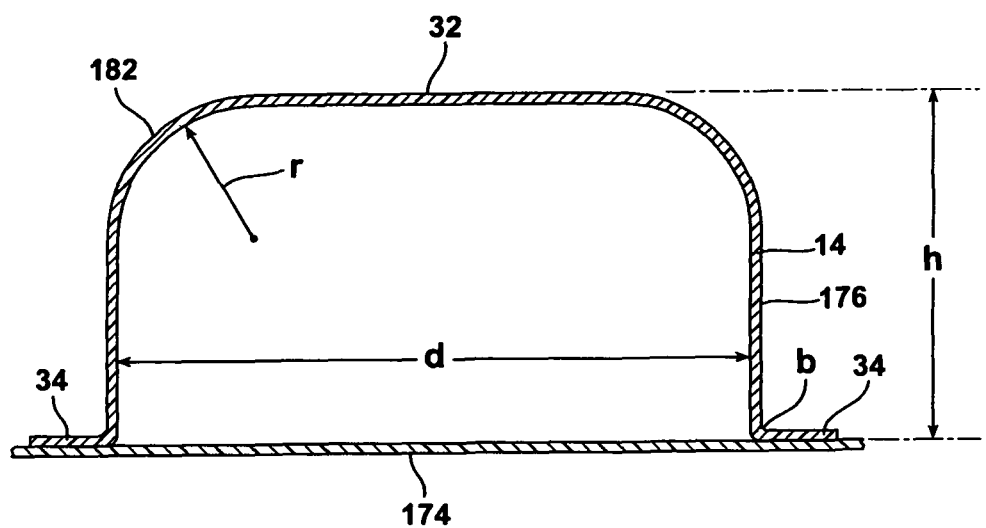
FIG. 3 is a cross-sectional view of an enlarged formed region of a portion of an air cellular assembly for use in the multilayer insulation laminate.

FIG. 3 is an enlarged cross-sectional schematic of a single air cell first air cellular assembly 14+174. Thermoformed film 14 is heat bonded to backing film 174 at land areas 34. Thermoformed film 14 is formed to overall height h, and includes base b having a circular perimeter of diameter d across formed circular side wall 176, and formed flat top 32. Formed flat top 32 connects with formed side walls 176 via formed corner 182, formed to radius r. In one embodiment, diameter d is 1.25 inches, height h is 0.672 inches, radius r is 0.31 inches, and flat top 178 has a diameter of 0.625 inches. In formed film 14, the individual formed regions can be arranged so that each formed regions has six other formed regions spaced equally therefrom, with the formed regions having a uniform minimum distance of 0.1 inch from one another.

FIG. 4 is a cut-away view of a schematic illustrating climate control duct 190 having spacers 192 thereon, with multilayer insulation laminate 10 positioned around duct 190. Multilayer insulation laminate 10 is separated from duct 190 by spacers 192, which preferably have a thickness of about 0.75 inch. Spacers can be made from strips of the same laminate from which the multilayer insulation laminate is made, or from any other suitable material. A plurality of spacers 192 are adhered to duct 190 at intervals, with multilayer insulation laminate 10 being positioned over spacers 192 to separate multilayer insulation laminate 10 from duct 190 by a gap that corresponds with the thickness of spacers 192. As illustrated in FIG. 4, pieces of multilayer insulation laminate 10 are wrapped around duct 190. The pieces of multilayer insulation laminate 10 can be fastened to one another with insulating tape 196 (e.g., Reflectix® brand UL181 insulation tape). Heat conductivity measurements conducted with the multilayer insulation laminate of Example 9 (below) around a duct, using a spacing of 0.75 inch between the duct and the multilayer insulation laminate, is believed to provide an insulation value of at least R-8 around duct 190.

While the insulation of the invention has a wide variety of end uses, it is particularly suited for use as a construction insulation material around heating and cooling ducts, hot water heaters, plumbing lines, and other articles in which flexible insulation is wrapped around an article, it can also be used to insulate walls, floors, ceilings, and other portions of residential and industrial construction.

Emittance Testing of Subcomponents A, B, C, D, and E

Five different subcomponent structures, for use in multilayer insulation laminates, were tested for IR emittance. The IR emittance test used was ASTM C 1371-04A, described above. Emittance testing was made from each side of each of the five subcomponents tested. For each subcomponent, the side yielding the lower of the two emittance values was deemed to be the "low emittance side" of the subcomponent, and the subcomponent side yielding the higher of the two emittance values was deemed to be the "high emittance side" of the subcomponent. Of course, for a single layer subcomponent, both sides yielded the same emittance value. In Table 1 below, the "low emittance side" of the subcomponent corresponds with the emittance of the left hand side of the subcomponent as set forth, with the right hand side of the subcomponent as set forth being the "high emittance side" of the subcomponent. Table 1, below, provides a description of each of the subcomponents tested, together with the low side emittance value obtained using ASTM C 1371-04 A, and the high side emittance value obtained using ASTM C 1371-04 A.

TABLE 1

| | Subcomponent Description | IR emittance (low side) | IR emittance (high side) | Number of metallized layers |
|---|---|---|---|---|
| A | 1.5 mil polyethylene monolayer | 0.250 | 0.250 | None |
| B | 1.5 mil polyethylene/adhesive | — | 0.452 | None |
| C | Laq/metallized/PET/metallized/adh/PE | 0.066 | 0.444 | 2 |
| D | metallized/PET | 0.035 | 0.485 | 1 |
| E | LDPE/metallized/PET | 0.227 | 0.489 | 1 |

The "polyethylene" (also referred to as "PE" in Subcomponent C) in Subcomponents A, B, and C was a blend of 80 weight % linear low density polyethylene ("LLDPE") and 20 weight % low density polyethylene ("LDPE"). The outer metallized PET layer of Subcomponent C was provided with a proprietary protective outer coating which may be a lacquer (hence, "Laq" in Table 1). The low density polyethylene ("LDPE") layer of subcomponent E had a thickness of 1.0 mil. The adhesive layer in subcomponents B and C (referred to as "adh" in Subcomponent C) had a thickness of approximately 0.1 mil, and was the same urethane-based adhesive as identified in Table 2, below.

As described herein, and as carried out in the various measurements reported herein, emittance was measured using ASTM C 1371-04A. Emittance measurements made for the various subcomponents and examples measured herein were carried out using a Model AE emissometer manufactured by Devices and Services Company of Dallas, Tex. The emissometer was powered to provide warm-up prior to use. A warm-up time of one hour in a conditioned laboratory was found to be acceptable. Calibration at high and low emittance was performed after the warm-up period, using a digital multimeter with 1.0 µV resolution. Test specimens were placed in good contact with the thermal sink that was part of the apparatus. A drop of distilled water between the test specimen and the thermal sink was used to improve the thermal contact. The measurement head of the emissometer was placed on the test specimen and held in place for at least 90 seconds for each measurement. The emissometer was calibrated prior to use and calibration was verified at the end of testing. The average emittance reported was based on six measurements.

The emittance results of subcomponents A-E of Table 1 reveal the emittance values of different materials and combinations of materials. Of course, a low emittance value corresponds with superior insulative effect, compared with a relatively higher emittance value, all other factors remaining the same. The IR emittance of 0.250 for subcomponent A demonstrates that a film made from this blend of LLDPE and LDPE exhibits a relatively low emittance value.

The IR emittance of multilayer Subcomponent B (same 1.5 mil polyethylene as in Subcomponent A, but having approximately 0.1 mil adhesive thereon) of 0.452 revealed a surprising and unexpected result that a relatively small amount of the adhesive layer (only about 7% of the total multilayer structure) has a very large effect upon the emittance of the multilayer structure, in that the emittance of the adhesive side of Subcomponent B is approximately 81% higher than the emittance of subcomponent A. That is, the presence of the adhesive layer only $\frac{1}{15}^{th}$ as thick as the polyethylene layer resulted in an approximately 81% increase in the of the emittance value, i.e., a total thickness increase of approximately 7% produced an emittance increase of approximately 81%.

Multilayer Subcomponent C was a six layer structure having a low side emittance of only 0.066, i.e., for the side of the bi-metallized PET layer having no outer polyethylene our adhesive over the proprietary protective coating (Laq) thereon. However, the high emittance side had an outer 1.5 mil polyethylene layer (same film as in Subcomponent A) adhered to an outer metallized surface of a 1.5 mil PET film with a 0.1 mil adhesive layer which was the same adhesive used in Subcomponent B. The result was a high side emittance of 0.444, which is close to the high side emittance of 0.452 of Subcomponent B, which contained no metallized layer. In effect, the presence of the outer metallized surface on the high emittance side of the bi-metallized PET of Subcomponent C had virtually no effect on lowering the emittance of this side of Subcomponent C. A comparison of the emittance of the high side of Subcomponent C with the high side emittance of Subcomponent B reveals that the presence of the adhesive and the polyethylene outward of the metallized surface resulted in a high side emittance which is 98% as high as if the metallized surface was not present below the PE and adhesive layers.

Multilayer Subcomponent D was a two-layer structure having a low side emittance of only 0.035, i.e., for the metallized side of the one-side metallized PET layer. The high side emittance was 0.485, which is the emittance of the PET layer itself. The high emittance side result of 0.485 shows that a bare PET layer exhibits a very high emittance, i.e., higher than the emittance of 0.1 mil adhesive plus 1.5 mil PE of Subcomponent B. However, the low emittance side result of only 0.035 demonstrates that an aluminum metallized surface of the PET layer greatly reduces the emittance of the PET layer, i.e., reduces it by about 93 percent.

Multilayer Subcomponent E was a three-layer structure having a centrally-position PET layer, with one of its surfaces being metallized and the other surface having a low density polyethylene extrusion coated directly thereon. The high side emittance of 0.489 represented the emittance of the PET layer and is consistent with the high side emittance of Subcomponent D. The low side emittance of 0.227 represented the emittance of the polyethylene layer directly adhered to the metallized layer, and is consistent with the emittance of the polyethylene monolayer of Subcomponent A. Thus, the emittance values of Subcomponent E confirm various emittance values exhibited by Subcomponents D and A.

Multilayer Insulation Laminates: Examples

Nine different multilayer insulation laminates were prepared and tested for thermal conductivity, with normalized intrinsic R-value being calculated as the inverse of the thermal conductivity, further normalized to a one inch thick sample. Each of the nine multilayer insulation laminates had at least one air-cellular component. Multilayer insulation laminates having two air-cellular components also had a PET film sheet between the two air-cellular assemblies. Each of the air-cellular components was made up of a thermoformed film (TFF) having an unformed land area bonded directly to a backing film (BF). Each of the thermoformed films had a specified nominal thickness (i.e., unformed thickness, i.e., thickness at land area), a plurality of discrete thermoformed regions, with each thermoformed region being discrete from the other thermoformed regions in that each thermoformed region was surrounded by an unformed land area. Each thermoformed region was of a generally cylindrical shape with either a flat top or slightly domed top, with a wall-to-top transition having a radius rather than an inflection point. Each generally cylindrical thermoformed region had a formed wall height and formed region base diameter. Each thermoformed film had a specified percent thermoformed area with the discrete thermoformed regions being arranged in rows of equidistant formed regions arranged along a straight line, with the rows being arranged in A-B-A-B-A-B . . . offset relationship, i.e., staggered formed regions. The backing film was directly bonded to the land area of the formed film.

Table 2, below, is a listing of the various components that were brought together in various combinations to make the nine multilayer insulation laminates.

TABLE 2

| Component Designation | Component Description | Film Thickness | Source |
| --- | --- | --- | --- |
| "PET" | Monolayer polyester film, 48 gauge, no metallized surfaces | 0.48 mil | Dunmore Corporation, 145 Wharton Road, Bristol, PA 19007 |
| "C-MPET" | One-side aluminum metallized ("M") 48 gauge polyester film, with proprietary protective coating ("C") over the outer surface of the metallized aluminum layer | 0.48 mil | Dunmore Corporation |
| "MPETM" | Two-side aluminum metallized 48 gauge PET film, uncoated | 0.48 mil | Dunmore Corporation |
| "C-MPETM" | Two-side aluminum metallized 48 gauge PET film, with proprietary protective coating over the outer surface of one of the two metallized aluminum layers | 0.48 mil | Dunmore Corporation |
| "BL" | Bonding Layer: monolayer film made from blend of 80 wt. % linear low density polyethylene and 20 wt. % low density polyethylene | 1.5 mil | Blako Industries, 10850 Middleton Pike, Dunbridge, Ohio 43414 |
| "//" | 2-part liquid adhesive plus catalyst: Primabond ® PB3250 adhesive (diphenyl methane diisocyanate) and Primabond ® PB300 catalyst: 2-part liquid adhesive + catalyst, reacting to form a urethane | approx. 0.1 mil | Henkel Corporation, 710 Ohio Street, Buffalo, N.Y. 14240 |
| "TFF1" | Thermoformed Film No. 1: monolayer film; blend of 80 wt. % linear low density polyethylene and 20 wt. % low density polyethylene; formed region diameter 1.25 inch, formed height 0.5 inch, percent formed area of about 90% | 2 mil (nominal) | Blako Industries, |
| "TFF2" | Thermoformed Film No. 2: multilayer A/B/C/B/A structure having a polyamide barrier layer; formed region diameter 1.25 inch, formed height 0.5 inch, percent formed area about 90% | | Sealed Air Corporation, Saddlebrook, N.J. |
| "BL2" | Bonding Layer No. 2: unformed multilayer A/B/C/B/A film; 1.5 mils; thermally bonded to land area of TFF2; | | Sealed Air Corporation |

In TFF2 and BF2, the A layers together made up 86 percent of the total film thickness, each of the B layers made up 2% of the total thickness, and the C layer made up 10% of the total film thickness. The C layer was an oxygen-barrier layer of 100% Caplon® B100WP polyamide 6 having a viscosity of Fav=100, obtained from Allied Chemical. Each of the B layers are tie layers made of 100% Plexar® PX165 anhydride modified ethylene copolymer from Quantum Chemical. Each of the A layers are a blend of 45% by weight HCX002 linear low density polyethylene having a density of 0.941 g/cc and a melt index of 4, obtained from Mobil, 45% by weight LF10218™ low density polyethylene having a density of 0.918 g/cc and a melt index of 2, obtained from Nova, and 10% by weight SLX9103™ metallocene-catalyzed ethylene/alpha-olefin copolymer, obtained from Exxon.

The formed regions of TFF1 were thermoformed to a diameter of 1 inch and a total height of 0.5 inch. The height of the formed regions included a vertical side wall having a height of about 0.25 inch, plus a "domed" top having a height extending approximately 0.25 inch above the vertical side wall. The formed regions were arranged so that each formed region was equidistant from 6 other formed regions, with the formed regions being spaced from one another by a minimum distance of approximately 0.1 inch.

Table 3, below, describes the subassemblies made from the components listed in Table 2, above. The presence of "//" indicates the presence of the liquid adhesive (Primabond® two part adhesive, described above) between the components being bonded together to make the subassembly. The presence of the "/" designation between components indicates a direct heat bond of the two components to one another, i.e., directly bonded without the presence of adhesive. The heat bond was made via extrusion coating, i.e., by extruding a molten stream of polymeric coating layer onto a solidified monolayer or multilayer substrate. Extrusion coating is described in, for example, in Brax et al U.S. Pat. No. 3,741,253, entitled "Laminates of Ethylene Vinyl Acetate Polymers and Polymers of Vinylidene Chloride", which is hereby incorporated, in its entirety, by reference thereto.

TABLE 3

| Subassembly Designation | Subassembly Description | Film Thickness |
| --- | --- | --- |
| PET | 48 gauge PET film, no metallized surface | 0.48 mil |
| C-MPET | 48 gauge PET film, one side having aluminum metallized coating, with protective coating over aluminum metallized coating | 0.48 mil |
| C-MPETM-C | 48 gauge PET film, each side having aluminum metallized coating, with a protective coating over each aluminum metallized coating | 0.48 mil |
| C-MPET//BL | One-side aluminum metallized 48 gauge PET film, with proprietary protective coating over the aluminum metallized surface, with 1.5 mil polyethylene bonding layer adhered to other side of PET, using Primabond ® two part polyurethane adhesive system, described above | 0.48 mil + 1.5 mil |
| C-MPET/BL | One-side aluminum metallized 48 gauge PET film, with proprietary protective coating over the aluminum metallized surface, with 1.5 mil polyethylene bonding layer extrusion coated to the other side of the PET layer, without the use of adhesive | 0.48 mil + 1.5 mil |
| C-MPETM//BL | Two-side aluminum metallized PET film, with proprietary protective coating over one of the aluminum metallized surfaces, with 1.5 mil polyethylene bonding layer adhered to other side of PET, using Primabond ® two part polyurethane adhesive system, described above | 0.48 mil + 1.5 mil |
| C-MPETM/BL | Two-side aluminum bi-metallized 0.48 mil PET film, with proprietary protective coating over one of the aluminum metallized surfaces, with 1.5 mil polyethylene bonding layer extrusion coated to the inner metallized layer on the PET film, without the use of adhesive | 0.48 mil + 1.5 mil |
| BL//PET//BL | 48 gauge PET film with no metallized coatings, with a 1.5 mil polyethylene bonding layer adhered to each side of the PET film, using Primabond ® two part polyurethane adhesive system, described above | 1.5 mil + 0.48 mil + 1.5 mil |
| BL/PET/BL | 48 gauge PET film with no metallized coatings, with 0.48 mil polyethylene bonding layers extrusion coated to each side of the PET layer, without the use of adhesive | 1.5 mil + 0.48 mil + 1.5 mil |
| BL//MPETM//BL | Two-side aluminum metallized 48 gauge PET film with 1.5 mil polyethylene bonding layer adhered to each of the metallized surfaces of the PET, using Primabond ® two part polyurethane adhesive system, described | 1.5 mil + 0.48 mil + 1.5 mil |
| BL/MPETM/BL | Two-side aluminum metallized 48 gauge PET film with 1.5 mil polyethylene bonding layer directly adhered to each of the metallized surfaces of the PET, without use of adhesive | 1.5 mil + 0.48 mil + 1.5 mil |
| TFF1/BL and BL/TFF1 | 2 mil thermoformed monolayer film ("TFF1") made from blend of 80 wt. % linear low density polyethylene and 20 wt. % low density polyethylene, containing thermoformed air-cellular regions having diameter of 1.25 inches and height of 0.5 inch, with land areas heat bonded to 1.5 mil bonding layer made from same 80% LLDPE/20% LDPE blend | 2 mil + 1.5 mil |
| TFF2/BL2 | thermoformed multilayer film barrier film having an A/B/C/B/A structure, with land areas heat bonded to | |

TABLE 3-continued

| Subassembly Designation | Subassembly Description | Film Thickness |
|---|---|---|
| | bonding layer #2, made from same A/B/C/B/A structure, with A, B, and C as described above for Table 2 | |

* Each "/" in the above identified components signifies the presence of the urethane adhesive, which forms a layer thickness of approximately 0.1 mil (thickness not included in film thickness column of Table 3)

Table 4, below, sets forth the combination and order of the components and subassemblies present for each of nine multilayer insulation laminate Examples 1-9. Table 4 uses the same component designations as Table 3. In Table 4 below, the designation of "C-MPET" is the equivalent of "PETM-C", with the position of the "C-M" and the "M-C" indicating the surface of the PET that has the metallized and protective coatings thereon, relative to the other subassemblies. The presence of the semicolon (";") in the assembly description indicates that the subassemblies are simply stacked on top of one another (in the order disclosed), without the subassemblies otherwise being fastened to one another. In Examples 1-9, for testing purposes, the various components were simply stacked together and tested for thermal conductivity (using ASTM C 518-04), rather than being adhered to one another to make a unitary product in which all layers of the multilayer laminate were adhered together. As a result, the bonding layer was thermally bonded to the thermoformed film in order to produce the air cellular assembly, with the PET and metallized PET layers being separately provided, contrary to the process of FIGS. 2A, 2B, and 2C, in which the bonding layer was laminated to the PET layer before it was bonded to the thermoformed film. For commercial end use, it is preferred that the subcomponents of the insulation laminate be fastened to one another using continuous or spot bonding (e.g., thermal bonding), continuous or spot bonding, spot welding, continuous or spot-gluing, perimeter bonding, perimeter welding, perimeter gluing, etc.

TABLE 4

| Example No. | Multilayer Laminate: Layer Arrangement | Multilayer Laminate: Normalized Intrinsic R-value per inch | Multilayer Laminate: Thermal Conductivity Btu · in/ft$^2$ · hr · ° F. (ASTM C 518 -04A) | Metallized Surfaces |
|---|---|---|---|---|
| 1 (comparative) | BL/TFF1; PET; TFF1/BL | 1.3935 | 0.7176 | 0 + 0 + 0 |
| 2 (comparative) | C-MPET; BL/TFF1; PET; TFF1/BL; PETM-C | 2.0032 | 0.4992 | 1 + 0 + 1 |
| 3 (working) | C-MPET; BL/TFF1; BL//MPETM//BL; TFF1/BL; PETM-C | 2.9878 | 0.3347 | 1 + 2 + 1 |
| 4 (comparative) | C-MPETM-C; BL/TFF1; PET; TFF1/BL; C-MPETM-C | 2.4528 | 0.4077 | 2 + 0 + 2 |
| 5 (working) | C-MPETM-C; BL/TFF1; BL//MPETM//BL; TFF1/BL; C-MPETM-C | 3.1949 | 0.3130 | 2 + 2 + 2 |
| 6 (comparative) | C-MPETM-C; BL2/TFF2; BL//MPETM//BL; TFF2/BL2; C-MPETM-C | 2.7480 | 0.3639 | 2 + 2 + 2 |
| 7 (working) | C-MPET; BL/TFF1; BL/MPETM-C | 3.134 | 0.3191 | 1 + 2 |
| 8 (working) | C-MPET; BL/TFF1; BL/MPETM/BL; TFF1/BL; PETM-C | 3.125 | 0.3200 | 1 + 2 + 1 |
| 9 (working) | C-MPETM-C; BL/TFF1; BL/MPETM/BL; TFF1/BL; C-MPETM-C | 3.27 | 0.3368 | 2 + 2 + 2 |

As can be seen by comparing the thermal conductivities of the various examples above, the multilayer insulation laminate of Example No. 1 (comparative) was made from a center PET sheet in combination with an air cellular assembly on each side thereof, exhibited a thermal conductivity of 0.7176 Btu·in·ft$^2$·hr·° F. (=normalized intrinsic R-value per inch of thickness of 1.3935), with no metallized coatings on any of the films. Turning next to Example No. 2 (comparative), the aluminum metallizing of the outer surface of each of the first and second outer metallized PET films, with no change in the air-cellular subassemblies and no change in the internal PET film subassembly, produced the substantially lower thermal conductivity of 0.4992 Btu·in/ft$^2$·hr·° F. (=normalized intrinsic R-value per inch of thickness of 2.0032). The increase in the normalized intrinsic R-value per inch of thickness from 1.3935 to 2.0032 (i.e., a 43.8% increase), is due to the presence of outer metallized layers that substantially lower the thermal conductivity of the insulation laminate.

A comparison of the multilayer insulation laminate of Example No. 2 (comparative) with the multilayer insulation laminate of Example No. 3 (working) shows a further and substantial lowering of thermal conductivity by providing the multilayer insulation laminate of Example No. 2 (comparative) with an internal PET film having two metallized coatings thereon as in the multilayer insulation laminate of Example No. 3 (working). As is apparent in Table 3, the addition of these two metallized coatings on the internal film in the embodiment of Example No. 3 (working) produced a thermal conductivity of 0.3347 Btu·in/ft$^2$·hr·° F. (=normalized, intrinsic R-value per inch of thickness of 2.9878), which is a greater than 32% improvement in resistance to thermal conductivity relative to the 0.4992 Btu·in/ft$^2$·hr·° F. (=normalized, intrinsic R-value per inch of thickness of 2.0032) exhibited by Example No. 2 (comparative). This comparison of Example No. 3 (working) with Example No. 2 (comparative) shows the value of providing the dual metallization of the surfaces of the internal PET film.

A comparison of the multilayer insulation laminate of Example No. 4 (comparative) with the multilayer insulation laminate of Example No. 3 (working) shows the substantial difference in providing the two additional metallized coatings on the internal film (Example No. 3, working) versus providing the two additional metallized coatings to the inside surfaces of the outer first and second metallized layers (Example No. 4, comparative). As can be seen, both Example No. 3 (working) and Example No. 4 (comparative) had a total of four metallized coatings on various film surfaces of the multilayer insulation laminate. However, while Example No. 3 (working) exhibited a thermal conductivity of 0.3347 Btu·in/ft$^2$·hr·° F. (=normalized, intrinsic R-value per inch of thickness of 2.9638), Example No. 4 (comparative) exhibited a higher thermal conductivity of 0.4077 Btu·in/ft$^2$·hr·° F. (=normalized, intrinsic R-value per inch of thickness of 2.4528). Comparing both Example No. 3 (working) and Example No. 4 (comparative) with Example No. 2 (comparative), it is apparent that all other factors remaining the same, the addition of two metallized coatings to the inside surface of the outer PET film lowered thermal conductivity from 0.4992 Btu·in/ft$^2$·hr·F.° (Example No. 2, comparative) to 0.4077 Btu·in/ft$^2$·hr·° F. (Example No. 4, comparative), for an 18.3% reduction in thermal conductivity. In contrast, the addition of two metallized coatings to the surfaces of the internal PET film lowered thermal conductivity from 0.4992 Btu·in/ft$^2$·hr·° F. (Example No. 2, comparative) to 0.3347 Btu·in/ft$^2$·hr·° F. (Example no. 3, working), which is a 26.5% reduction in thermal conductivity. These results demonstrate that the placement of the two additional metallized coatings on the internal PET film was about 45% more effective in reducing thermal conductivity than the placement of the two additional metallized coatings on the inside surface of the outer metallized layers.

A comparison of Example No. 3 (working) with Example No. 5 (working) shows that providing each of the outer films with two metallized PET coatings in combination with providing the internal film with two metallized PET coatings, for a total of six metallized coatings, further reduces thermal conductivity from 0.3347 Btu·in/ft$^2$·hr·° F. (=normalized, intrinsic R-value per inch of 2.9878 for Example No. 3, working) to only 0.3130 Btu·in/ft$^2$·hr·° F. (=normalized, intrinsic R-value per inch of 3.1949 for Example No. 5, working). This is an additional thermal conductivity decrease of approximately 6.5%, due to the extra metallized surface on each of the PET films (Example No. 5, working), versus the one-surface-metallized PET films of Example No. 3 (working).

A comparison of Example No. 5 (working) with Example No. 6 (comparative), each of which had a total of six metallized coatings, demonstrates that the polymeric content of the laminate can have a substantial effect on the thermal conductivity of the laminate. Each of the multilayer formed films (TFF2) and bonding layers (BL2) of Example No. 6 (comparative) had internal polyamide barrier layers. Polyamide is not as transparent to infrared radiation as are the linear low density polyethylene and low density polyethylene in the formed films (TTF1) and backing films (BF1) of Example No. 5 (working). Accordingly, this difference is believed to be the reason for the relatively low thermal conductivity of 0.3130 Btu·in/ft$^2$·hr·° F. of Example No. 5 (working) versus the relatively high thermal conductivity of 0.3639 Btu·in/ft$^2$·hr·° F. of Example No. 6 (comparative).

Example Nos. 7, 8, and 9 are each working examples of the invention. In each of Example Nos. 7, 8, and 9, the bonding layers are extrusion coated directly onto the aluminum metallized surface of a metallized PET layer (as is apparent from the "/" designation), or directly onto a non-metallized surface of a PET layer (as is apparent from the "/" designation), regardless of whether the PET layer is an outer layer (Example Nos. 7 and 8) or a inner layer (Example Nos. 8 and 9). The multilayer insulation laminates of Examples 7, 8, and 9 exhibited Normalized Intrinsic R-Values per inch of 3.134, 3.125, and 3.27, respectively. These normalized R-Values are higher than corresponding examples utilizing the Primabond® two part polyurethane adhesive system, described above. More particularly, the normalized intrinsic R-value of Example No. 7 (working), with only three metallized layers and only one air-cellular assembly, was 3.134, was 27.8% higher than the normalized R-value of 2.4528 of Example No. 4 (comparative) which had four metallized layers and two air cellular assemblies but had urethane adhesive adhering the bonding layers to both sides of an internal PET layers and to both internal metallized coatings, and even 4.9% higher than the normalized R-value of 2.9878 of Example No. 3 (working), which had four metallized layers and two air cellular assemblies, but also had urethane adhesive adhering bonding layers to metallized coatings and to the outer PET layers.

Similarly, the normalized intrinsic R-value of 3.125 exhibited by Example No. 8 (working), with a total of four metallized layers and two air cellular assemblies, was 27.4% higher than the normalized R-value of 2.4528 of Example No. 4 (comparative) which also had four metallized layers and two air cellular assemblies but had urethane adhesive adhering the bonding layers to both sides of an internal PET layers and to both internal metallized coatings. Moreover, the normalized intrinsic R-value of Example No. 8 (working) was even 4.9% higher than the normalized R-value of 2.9878 of Example No.

3 (working), which also had four metallized layers and two air cellular assemblies, but which had urethane adhesive adhering bonding layers to internal metallized coatings of the outer PET layers.

Moreover, the normalized intrinsic R-value of Example No. 9 (working) was 3.27, which with a total of six metallized layers and two air cellular assemblies was 2.35% higher than the normalized R-value of 3.1949 of Example No. 5 (comparative), which also had six metallized layers and two air cellular assemblies. Comparing the normalized R-value of Example No. 7 (working) against Example No. 3 (comparative), and comparing the normalized R-value of Example No. 8 (working) against Example No. 3 (comparative), and comparing the normalized R-value of Example No. 9 (working) against Example No. 5 (comparative), it is apparent that measurably higher normalized R-value is obtained via direct bonding of polyethylene to the metallized surface, versus bonding using the Primabond® two part polyurethane adhesive system, described above.

A commercial embodiment of the multilayer insulation laminate had the following structure in which each "/" represents a direct bond, i.e., without adhesive:

C-MPETM/BL/TFF1/BL/MPETM/BL/TFF1/BL/MPETM-C

The commercial embodiment was made from combining two outer subassemblies with a central subassembly, with each of the outer subassemblies connecting with the central subassembly via thermoformed film "TFF1". The two outer subassemblies correspond with the "C-MPETM/BL" and "BL/MPETM-C" portions of the commercial embodiment structure above. This subassembly was sold by Dunmore Corporation as product designation "M021102". As is apparent from the commercial structure above, each outer subassembly was oriented in the commercial structure with an inwardly-facing "/BL" portion, which was a 1 mil low density polyethylene directly bonded (i.e., heat welded) to the inner "M" layer of the outer subassembly. Each of the "M" layers of each of the outer subassemblies were vapor deposited metallized aluminum layers, with the "PET" portion of each outer subassembly being a 48 gauge monolayer PET film. The "C" portion of each outer subassembly was a proprietary protective coating over the outer aluminum layer. The central subassembly of the commercial embodiment above corresponds with the "BL/MPETM/BL" portion of the commercial embodiment above. The central subassembly was obtained from Dunmore Corporation as product designation "M021101", with the central PET again being a 48 gauge monolayer PET film, the M layers each being vapor deposited metallized aluminum layers, and the "BL" layers each being a 1 mil low density polyethylene layer directly bonded the respective M layers. In the commercial embodiment, the "TFF1" components connecting the outer subassemblies with the central subassembly were each formed from a 2 mil monolayer film made from a blend of 80 wt % linear low density polyethylene and 20 wt % low density polyethylene, obtained from Blako Industries. The TFF1 films were purchased from Blako Industries as flat film and were thereafter thermoformed in the same manner as for the making of the thermoformed film of cellular cushioning (e.g., Bubble Wrap® cellular cushioning), with discrete formed regions having a diameter of 1.25 inch and a height of 0.5 inch, with the % formed area being about 90%. In the commercial embodiment, the thermoformed regions were oriented so that the tops of the thermoformed regions were directly adhered (i.e., directly heat welded, without adhesive) to the bonding layer (BL) of the central subassembly, i.e., as in FIG. 2C, above. The other sides of each of the thermoformed films, i.e., the land areas between the thermoformed areas, were directly bonded to the bonding layer (BL) of the respective outer subassemblies.

When properly installed, the multilayer insulation laminate produces an R-value greater than its intrinsic R-value. As a result, it is believed that the multilayer insulation laminate of Example Nos. 3, 5, 7, 8, and 9, as well as the commercial embodiment above, when installed around a duct using ¾ inch spacers, provide an R-value of at least 8 when measured according to ASTM C 335.

What is claimed is:

1. A multilayer insulation laminate comprising:
   (A) a multilayer first outer film comprising an outer first polymeric layer having a first metallized coating on an outer surface thereof and a second metallized coating on the inner surface thereof, with the second metallized coating having a first bonding layer bonded directly thereto on an inner side thereof;
   (B) a multilayer second outer film comprising an outer second polymeric layer having a third metallized coating on an outer surface thereof and a fourth metallized coating on the inner surface thereof, with the fourth metallized coating having a second bonding layer bonded directly thereto on an inner side thereof;
   (C) an internal polymeric film having a fifth metallized coating on a surface thereof, the fifth polymeric film being between the outer first polymeric layer and the outer second polymeric layer, the fifth metallized coating being directly bonded to-a third bonding layer between the first and second bonding layers; and,
   (D) an air cellular assembly between the first bonding layer and the second bonding layer, the air-cellular assembly comprising a plurality of air-filled cells between thermoformed regions of a thermoformed film having a land area which is bonded directly to a member selected from the group consisting of the first bonding layer, the second bonding layer, and the third bonding layer.

2. The multilayer insulation laminate according to claim 1, wherein the air cellular assembly is present in an internal reflective space having a low side emittance of up to 0.3.

3. The multilayer insulation laminate according to claim 2 wherein the first metallized coating exhibits an emittance of up to 0.1, the second metallized coating exhibits an emittance of up to 0.1.

4. The multilayer insulation laminate according to claim 1, wherein the multilayer insulation laminate has a thermal conductivity of less than 0.34 Btu·in/ft$^2$·hr·° F., as measured by ASTM C 518-04.

5. The multilayer insulation laminate according to claim 1, wherein the outer first polymeric layer comprises polyester, the first metallized coating comprises aluminum, the first bonding layer comprises polyolefin, the outer second polymeric layer comprises polyester, the second metallized coating comprises aluminum, the second bonding layer comprises polyolefin, and the thermoformed film comprises polyolefin.

6. A multilayer insulation laminate comprising:
   (A) a multilayer first outer film comprising an outer first polymeric layer having a first metallized coating on an outer surface thereof and a first bonding layer on an inner side thereof;
   (B) a multilayer second outer film comprising an outer second polymeric layer having a second metallized coating on an outer surface thereof and a second bonding layer on an inner side thereof;
   (C) an internal polymeric film between the first outer film and the second outer film, the internal film having a third metallized coating on a surface thereof, the third metallized coating being directly bonded to-a third bonding layer between the first and second bonding layers; and, (D) an air cellular assembly between the first bonding layer and the second bonding layer, the air-cellular assembly comprising a plurality of air-filled cells between thermoformed regions of a first thermoformed film having a land area which is bonded directly to the first bonding layer or the third bonding layer; and wherein the thermoformed film is a first thermoformed film and the air cellular assembly is a first air cellular assembly and the internal polymeric film further comprises a fourth metallized coating on a surface thereof, with the fourth metallized coating having a fourth bonding layer directly bonded thereto, with the multilayer insulation laminate further comprising second air-cellular assembly comprising a second thermoformed film between the second bonding layer and the fourth bonding layer, the second air-cellular assembly comprising a second plurality of air-filled cells between the second thermoformed film and the second bonding layer, with the second thermoformed film having a land area directly bonded to the second bonding layer, with the thermoformed regions of the second thermoformed film being directly bonded to the fourth bonding layer.

7. The multilayer insulation laminate according to claim 6, wherein the first air cellular assembly is present in a first internal reflective space having a low side emittance of up to 0.3, and the second air cellular assembly is present in a second internal reflective space having a low side emittance of up to 0.3.

8. The multilayer insulation laminate according to claim 6, wherein the outer first polymeric layer has a fifth metallized coating on the inner surface thereof, with the fifth metallized coating having the first bonding layer directly bonded thereto, and the outer second polymeric layer has a sixth metallized coating on the inner surface thereof, with the sixth metallized coating having the second bonding layer directly bonded thereto.

9. The multilayer insulation laminate according to claim 8, wherein the first air cellular assembly is present in a first internal reflective space having a low side emittance of up to 0.3 and a high side emittance of up to 0.3, and the second air cellular assembly is present in a second internal reflective space having a low side emittance of up to 0.3 and a high side emittance of up to 0.3.

10. The multilayer insulation laminate according to claim 1, wherein the first metallized coating has a protective coating over an outer surface thereof, and the second metallized coating has a protective coating over an outer surface thereof.

11. The multilayer insulation laminate according to claim 1, wherein:
the first bonding layer comprises at least one member selected from the group consisting of olefin homopolymer, olefin copolymer, olefin/unsaturated ester copolymer, olefin/unsaturated acid copolymer, anhydride-modified polyolefin, and ionomer resin; and
the second bonding layer comprises at least one member selected from the group consisting of olefin homopolymer, olefin copolymer, olefin/unsaturated ester copolymer, olefin/unsaturated acid copolymer, anhydride-modified polyolefin, and ionomer resin; and,
wherein each of the formed regions of the thermoformed film has a diameter of from 0.2 to 2 inches and a height of from 0.2 to 0.9 inch, and the insulation laminate has a total polymeric thickness of from 7 to 20 mils, the insulation laminate has a total thickness of from 1.5 to 4 centimeters, and the insulation laminate exhibits an intrinsic normalized R-Value per inch of at least 2.9, and the insulation laminate has a ratio of total polymeric thickness in mils to intrinsic normalized R-Value per inch of from 2.3:1 to 6.7:1.

12. The multilayer insulation laminate according to claim 6, wherein the first plurality of gas-filled cells is in an internal reflective space having a low side emittance of up to 0.3, and the second plurality of gas-filled cells is in an internal reflective space having a low side emittance of up to 0.3, and wherein the multilayer insulation laminate has a total polymeric thickness of from 7 to 20 mils, the insulation laminate has a total thickness of from 1.5 to 4 centimeters, and the insulation laminate exhibits an intrinsic normalized R-Value per inch of at least 2.9.

13. A climate control duct surrounded by a multilayer insulation laminate comprising:
(A) a multilayer first outer film comprising an outer first polymeric layer having a first metallized coating on an outer surface thereof and a first bonding layer on an inner side thereof;
(B) a multilayer second outer film comprising an outer second polymeric layer having a second metallized coating on an outer surface thereof and a second bonding layer on an inner side thereof;
(C) an internal polymeric film between the first outer film and the second outer film, the internal film having a third metallized coating on a surface thereof, the third metallized coating being directly bonded to-a third bonding layer between the first and second bonding layers; and,
(D) an air cellular assembly between the first bonding layer and the second bonding layer, the air-cellular assembly comprising a plurality of air-filled cells between thermoformed regions of a first thermoformed film having a land area which is bonded directly to the first bonding layer or the third bonding layer; and
wherein the thermoformed film is a first thermoformed film and the air cellular assembly is a first air cellular assembly and the internal polymeric film further comprises a fourth metallized coating on a surface thereof, with the fourth metallized coating having a fourth bonding layer directly bonded thereto, with the multilayer insulation laminate further comprising a second air-cellular assembly comprising a second thermoformed film between the second bonding layer and the fourth bonding layer, the second air-cellular assembly comprising a second plurality of air-filled cells between the second thermoformed film and the second bonding layer, with the second thermoformed film having a land area directly bonded to the second bonding layer, with the thermoformed regions of the second thermoformed film being directly bonded to the fourth bonding layer; and
wherein the first plurality of gas-filled cells is in an internal reflective space having a low side emittance of up to 0.3, and the second plurality of gas-filled cells is in an internal reflective space having a low side emittance of up to 0.3, and wherein the multilayer insulation laminate has a total polymeric thickness of from 7 to 20 mils, the insulation laminate has a total thickness of from 1.5 to 4 centimeters, and the insulation laminate exhibits an intrinsic normalized R-Value per inch of at least 2.9.

14. A climate control duct surrounded by a multilayer insulation laminate comprising:
(A) a multilayer first outer film comprising an outer first polymeric layer having a first metallized coating on an outer surface thereof and a second metallized coating on the inner surface thereof, with the second metallized coating having a first bonding layer bonded directly thereto on an inner side thereof;

(B) a multilayer second outer film comprising an outer second polymeric layer having a third metallized coating on an outer surface thereof and a fourth metallized coating on the inner surface thereof, with the fourth metallized coating having a second bonding layer bonded directly thereto on an inner side thereof;

(C) an internal polymeric film having a fifth metallized coating on a surface thereof, the fifth polymeric film being between the outer first polymeric layer and the outer second polymeric layer, the fifth metallized coating being directly bonded to-a third bonding layer between the first and second bonding layers; and, (D) an air cellular assembly between the first bonding layer and the second bonding layer, the air-cellular assembly comprising a plurality of air-filled cells between thermoformed regions of a thermoformed film having a land area which is bonded directly to a member selected from the group consisting of the first bonding layer, the second bonding layer, and the third bonding layer.

15. The climate control duct according to claim 14, further comprising a spacer between the multilayer insulation laminate and the duct, the spacer providing an air-filled gap between 0.25 inch and 1.25 inch between an inside surface of the multilayer insulation laminate and an outside surface of the duct.

16. The climate control duct according to claim 15, wherein the spacer and the multilayer insulation laminate provide insulation exhibiting an R-value of at least 8.

17. The climate control duct according to claim 15, wherein the first metallized coating has a protective coating over an outer surface thereof, and the second metallized coating has a protective coating over an outer surface thereof.

* * * * *